(12) United States Patent
Armstrong et al.

(10) Patent No.: US 8,065,336 B2
(45) Date of Patent: Nov. 22, 2011

(54) DATA SEMANTICIZER

(75) Inventors: Patrick Joseph Armstrong, Columbia, MD (US); Nada Hashmi, Boston, MA (US); Sung Youn Lee, Great Falls, VA (US); Ryusuke Masuoka, Potomac, MD (US); Zhexuan Song, Silver Spring, MD (US)

(73) Assignee: Fujitsu Limited, Kawasaki (JP)

( * ) Notice: Subject to any disclaimer, the term of this patent is extended or adjusted under 35 U.S.C. 154(b) by 1725 days.

(21) Appl. No.: 11/014,904

(22) Filed: Dec. 20, 2004

(65) Prior Publication Data

US 2006/0136194 A1 Jun. 22, 2006

(51) Int. Cl.
*G06F 17/30* (2006.01)
*G06F 7/00* (2006.01)

(52) U.S. Cl. ....................................... 707/794
(58) Field of Classification Search .................. 707/794, 707/810
See application file for complete search history.

(56) References Cited

U.S. PATENT DOCUMENTS

| | | | |
|---|---|---|---|
| 5,224,205 A | 6/1993 | Dinkin et al. | |
| 5,530,861 A | 6/1996 | Diamant et al. | |
| 5,815,811 A | 9/1998 | Pinard et al. | |
| 5,968,116 A | 10/1999 | Day, II et al. | |
| 5,979,757 A | 11/1999 | Tracy et al. | |
| 6,002,918 A | 12/1999 | Heiman et al. | |
| 6,067,297 A | 5/2000 | Beach | |
| 6,084,528 A | 7/2000 | Beach et al. | |
| 6,101,528 A | 8/2000 | Butt | |
| 6,173,316 B1 | 1/2001 | De Boor et al. | |
| 6,178,426 B1 | 1/2001 | Klein et al. | |
| 6,188,681 B1 | 2/2001 | Vesuna | |
| 6,199,753 B1 | 3/2001 | Tracy et al. | |
| 6,216,158 B1 | 4/2001 | Luo et al. | |
| 6,286,047 B1 | 9/2001 | Ramanathan et al. | |
| 6,324,567 B2 | 11/2001 | Chidambaran et al. | |

(Continued)

FOREIGN PATENT DOCUMENTS

JP 2004-318809 11/2004

OTHER PUBLICATIONS

Ankolekar, Anupriya, et al., "DAML-S: Web Service Description for the Semantic Web", The Semantic Web—ISWC 2002. First International Web Conference Proceedings (Lecture Notes in Computer Science vol. 2342), The Semantic Web—ISWC 2002; XP-002276131; Sardinia, Italy; Jun. 2002; (pp. 348-363).

(Continued)

*Primary Examiner* — Kuen S Lu
(74) *Attorney, Agent, or Firm* — Staas & Halsey LLP

(57) ABSTRACT

A computer-implemented method of defining a set of annotation elements to map a concept to electronic data as input data; generating a mapping rule, according to the set of annotation elements defined and a sample of the input data; mapping the concept to the input data by applying the mapping rule to the input data; and generating a semantic instance of the input data based upon the mapping of the concept to the input data. The set of annotation elements to map the concept to the input data are a selected ontology corresponding to the input data, a selected ontology concept from the selected ontology, a mapping of a word or word phrase in the sample input data to the selected ontology concept from the selected ontology, and a pattern of the mapped word or word phrase relative to a structure of the sample input data.

26 Claims, 16 Drawing Sheets

U.S. PATENT DOCUMENTS

| | | | |
|---|---|---|---|
| 6,430,395 | B2 | 8/2002 | Arazi et al. |
| 6,446,096 | B1 | 9/2002 | Holland et al. |
| 6,456,892 | B1 | 9/2002 | Dara-Abrams et al. |
| 6,466,971 | B1 | 10/2002 | Humpleman et al. |
| 6,502,000 | B1 | 12/2002 | Arnold et al. |
| 6,509,913 | B2 | 1/2003 | Martin, Jr. et al. |
| 6,556,875 | B1 | 4/2003 | Nagasaka et al. |
| 6,560,640 | B2 | 5/2003 | Smethers |
| 6,757,902 | B2 | 6/2004 | Katz et al. |
| 6,792,605 | B1 | 9/2004 | Roberts et al. |
| 6,859,803 | B2 | 2/2005 | Dagtas et al. |
| 6,901,596 | B1 | 5/2005 | Galloway |
| 6,910,037 | B2 | 6/2005 | Gutta et al. |
| 6,947,404 | B1 | 9/2005 | Zalka |
| 6,956,833 | B1 | 10/2005 | Yukie et al. |
| 6,983,227 | B1 | 1/2006 | Thalhammer-Reyero |
| 7,065,058 | B1 | 6/2006 | Korus |
| 7,079,518 | B2 | 7/2006 | Park et al. |
| 7,170,857 | B2 | 1/2007 | Stephens et al. |
| 7,376,571 | B1 | 5/2008 | Racine et al. |
| 7,406,660 | B1 * | 7/2008 | Sikchi et al. .................. 715/234 |
| 7,424,701 | B2 | 9/2008 | Kendall et al. |
| 7,548,847 | B2 * | 6/2009 | Acero et al. ...................... 704/9 |
| 7,577,910 | B1 | 8/2009 | Husemann et al. |
| 7,596,754 | B2 | 9/2009 | Wessling et al. |
| 7,610,045 | B2 | 10/2009 | Little et al. |
| 2002/0078255 | A1 | 6/2002 | Narayan |
| 2002/0107939 | A1 | 8/2002 | Ford et al. |
| 2002/0116225 | A1 | 8/2002 | Morse et al. |
| 2003/0036917 | A1 | 2/2003 | Hite et al. |
| 2003/0204645 | A1 | 10/2003 | Sharma et al. |
| 2004/0054690 | A1 | 3/2004 | Hillerbrand et al. |
| 2004/0083205 | A1 | 4/2004 | Yeager |
| 2004/0204063 | A1 | 10/2004 | Van Erlach |
| 2004/0207659 | A1 | 10/2004 | Goodman et al. |
| 2004/0230636 | A1 | 11/2004 | Masuoka et al. |
| 2005/0021560 | A1 | 1/2005 | Yoon et al. |
| 2005/0060372 | A1 | 3/2005 | DeBettencourt et al. |
| 2005/0080768 | A1 | 4/2005 | Zhang et al. |
| 2005/0160362 | A1 * | 7/2005 | Obradovic et al. ........... 715/527 |
| 2006/0195411 | A1 | 8/2006 | Knight et al. |
| 2007/0157096 | A1 | 7/2007 | Keren et al. |

OTHER PUBLICATIONS

Bader, Gary D., et al., BioPAX—Biological Pathways Exchange Language, Level 1, Version 1.0 Documentation; © 2004 BioPAX Workgroup, BioPAX Recommendation [online] Jul. 7, 2004; Retrieved from the Internet: <URL: http://www.biopax.org/release/biopax-level1.owl>.

De Roure, David, et al., "E-Science", Guest Editors' Introduction, IEEE Intelligent Systems; Published by the IEEE Computer Society, © Jan./Feb. 2004 IEEE, pp. 24-63.

"Gene Ontology Consortium" OBO—Open Biological Ontologies; [online] [Retrieved on Oct. 22, 2004] Retrieved from the Internet <URL: http://www.geneontology.org/> (6 pages).

Handschuh S., et al. "Annotation for the deep web", IEEE Intelligent Systems, IEEE Service Center, New York, NY, US, vol. 18, No. 5, Sep. 1, 2003; pp. 42-48; XP011101996 ISSN: 1094-7167—Abstract (1 page).

Zhexuan Song, et al. "Dynamic Service Discovery and Management in Task Computing," pp. 310-318, MobiQuitous 2003, Aug. 22-26, 2004, Boston, pp. 1-9.

MaizeGDB, "Welcome to MaizeGDB!", Maize Genetics and Genomics Database; [online] [Retrieved on Oct. 22, 2004] Retrieved from the Internet <http://www.maizegdb.org/>.

Marenco et al., "QIS: A framework for biomedical database federation" Journal of the American Medical Informatics Association, Hanley and Belfus, Philadelphia, PA, US, vol. 11, No. 6, Nov. 1, 2004; pp. 523-534, XP005638526; ISSN: 1067-5027.

Ramey, Chet; "Bash Reference Manual", Version 2.02, Apr. 1, 1998; XP-002276132; pp. i-iv; p. 1; and pp. 79-96.

Trellis, "Capturing and Exploiting Semantic Relationships for Information and Knowledge Management", The Trellis Project at Information Sciences Institute (ISI), [online] [Retrieved on Oct. 22, 2004] Retrieved from the Internet <URL: http://www.isi.edu/ikcap/trellis/> 2 pages.

Information Sciences Institute; USC Viterbi School of Engineering; [online] [Retrieved on Oct. 22, 2004] Retrieved from the Internet <URL: http://www.isi.edu> 2 pages.

Mindswap—Maryland Information and Network Dynamics Lab Semantic Web Agents Project; SWOOP—Hypermedia-based OWL Ontology Browser and Editor; [online] [Retrieved on Oct. 22, 2004] Retrieved from the Internet <URL: http://www.mindswap.org/2004/SWOOP> (3 pages).

Mindswap—Maryland Information and Network Dynamics Lab Semantic Web Agents Project; OntoLink; Semantic Web Research Group; [online] [Retrieved on Oct. 22, 2004] Retrieved from the Internet <URL: http://www.mindswap.org/2004/OntoLink> (2 pages).

Mindswap—Maryland Information and Network Dynamics Lab Semantic Web Agents Project; Pellet OWL Reasoner; [online] [Retrieved on Oct. 22, 2004] Retrieved from the Internet <URL: http://www.mindswap.org/2003/pellet/index.shtml> (3 pages).

Haarslev, Volker, "Racer", RACER System Description; News: New Racer Query Language Available; [online] [Retrieved on Oct. 22, 2004] Retrieved from the Internet <URL: http://www.cs.concordia.ca/~haarslev/racer> (10 pages).

Jambalaya, the CHISEL group; CH/SEL—Computer Human Interaction & Software Engineering Lab, Home; [online] [Retrieved on Oct. 22, 2004] Retrieved from the Internet <URL: http://www.thechiselgroup.org/jambalaya> (1 page).

Malik, Ayesha, "XML, Ontologies, and the Semantic Web", XML Journal, Openlink Virtuoso; [online] [Retrieved on Oct. 22, 2004] Retrieved from the Internet <URL: http:///www.sys-con.com/xml1/article.cfm?id=577> (7 pages).

Altschul, SF, et al., "Basic local alignment search tool", National Center for Biotechnology information, National Library of Medicine, National Institutes of Health, Bethesda, Maryland 20894; [online] [Retrieved on Oct. 22, 2004] Retrieved from the Internet <URL: http://www.ncbi.nlm.nih,gov/entrez/query.fcgi?cmd=Retrieve&db=> (3 pages).

NCBI Blast Information; [online] [Retrieved on Oct. 22, 2004] Retrieved from the Internet <URL: http://www.ncbi.nih.gov/Education/BLASTinfo/information3.html> (1 page).

Example of Terrorism Ontology; [online] [Retrieved on Dec. 16, 2004] Retrieved from the Internet <URL http://www.mindswap.org/2003/owl/swint/terrorism> (7 pages).

Guttman, E., et al., "Service Location Protocol, Version 2", Network Working Group; @ Home Network; Vinca Corporation; Jun. 1999 (pp. 1-55).

Masuoka, Ryusuke, et al., "Task Computing—The Semantic Web meets Pervasive Computing—" Fujitsu Laboratories of America, Inc., [online] vol. 2870, 2003, pp. 866-881, <URL: http://www.mindswap.org> XP-002486064.

Rysuke Masuoka, et al. "Semantic Web and Ubiquitous Computing-Task Computing as an Example-" *AIS SIGSEMIS* Bullentin, vol. 1 No. 3, Oct. 2004, pp. 21-24.

Rysuke Masuoka, et al. "Ontology-Enabled Pervasive Computing Applications,"*IEEE Intelligent Systems*, vol. 18, No. 5, Sep./Oct. 2003 (Sep. 1, 2003), pp. 68-72.

Rysuke Masuoka, et al. Task Computing- Semantic-web enabled, user driven, interactive environments, WWW Based Communities For Knowledge Presentation, Sharing, Mining and Protection (The PSMP workshop) within CIC 2003, Jun. 23-26, 2003, pp. 1.

Rysuke Masuoka, et al. "Task Computing—Filling the Gap Between Tasks and Services," Fujitsu, vol. 55;No. 4; pp. 376-383 (2004) (In Japanese) (English Abstract) (1 page).

Masuoka Ryusuke, DAML Program and the Semantic Web : Toward a More Ontological World, Journal of Japanese Society for Artificial Intelligence, Japan Jul. 2002 17(4) pp. 392-399 (pp. 397-398 "6. The future of DAML").

Goble, C., et al., Semantic Web and Grid Computing, [online], Sep. 5, 2002, pp. 1-23, [H20.8.27. search], Internet<URL:http://www.semanticgrid.org/documents/swgc/swgc-final.pdf (pp. 16-17 "8.1 MyGrid (www.mygrid.org.uk)" and Figure 5).

Preece, A., et al., Intelligent Web Services, Intelligent Systems, IEEE, Jan. 2002, vol. 17, Issue 1, pp. 15-17 (p16, Column right and p17, Column left).

1. The Semantic Grid, [online], Oct. 2002., [H21.1.5. search], Internet <URL: http://web.archive.org/web/20021011030835/http://www.semanticgrid.org/documents/>.

The Semantic Web—ISWC 2002, First International Semantic Web Conference, Sardinia, Italy, Jun. 9-12, 2002, Proceedings, Springer, Jun. 9, 2002, [H21.1.6. search], Internet<URL: http://www.springer.com/computer/database+management+%26+information+retrieval/book/978-3-540-43760-4?detailsPage=toc>.

U.S. Appl. No. 11/014,904, filed Dec. 20, 2004, Patrick Joseph Armstrong, Fujitsu Limited Kawasaki, Japan.

U.S. Appl. No. 11/115,403, filed Apr. 27, 2005, Yannis Labrou, et al., Fujitsu Limited Kawasaki, Japan.

European Search Report Communication issued May 7, 2004 in related Europeans Application No. 03257974.0-1243 (4 pages).

European Patent Office Communication issued Sep. 5, 2005 in related European Application No. 03257974.0-1243 (12 pages).

European Patent Office Communication issued Jan. 22, 2007 in related European Application No. 03257974.0-1243.

First Notification of Office Action issued by the State Intellectual Property Office of China on Jul. 27, 2007 in related China Application No. 200310123963.2, including the Text of the First Office Action (28 pages).

First Notification of Office Action (PCT Application Entry Into the National Phase) issued by the State Intellectual Property Office of China on Dec. 7, 2007, in the related Chinese Patent Application No. 200580013453.7 (22 pages).

Second Notification of Office Action issued by the State Intellectual Property Office of China on Jan. 4, 2008, in related Chinese Patent Application No. 200310123963.2 (2 pages).

First Notification of Office Action issued by the State Intellectual Property Office of China on Mar. 14, 2008 in corresponding Chinese Patent Application No. 200510132687.5 (9 pages).

Second Notification of Office Action issued by the State Intellectual Property Office of China on Sep. 5, 2008 in corresponding Chinese Patent Application No. 200510132687.5, including the Text of the Second Office Action (8 pages).

Third Notification of Office Action issued by the State Intellectual Property Office of China on May 9, 2008 in related China Application No. 200310123963.2, including the Text of the Third Office Action (8 pages).

Rejection Decision issued by the State Intellectual Property Office of China on Sep. 5, 2008 in related China Application No. 200310123963.2, including the Text of the Decision for Rejection (8 pages).

Extended European Search Report Communication issued Aug. 11, 2008 in corresponding European Application No. 05027181.6-1527/1672537.

Notice of Completion of Formalities for Patent Registration with the Notice of Decision of Granting Patent Right for Invention, dated Oct. 10, 2008, issued in related China Application No. 200580013453.7.

Notification of Transmittal of the International Search Report and the Written Opinion of the International Searching Authority, or the Declaration issued Jun. 27, 2006 in related International Application No. PCT/US05/14557.

Notification Concerning Transmittal of International Preliminary Report on Patentability (Chapter I of the Patent Cooperation Treaty) mailed Nov. 9, 2006 in related international Application No. PCT/US2005/014557.

Supplementary European Search Report issued by the EPC on Jul. 18, 2008 in related European Application No. 05739051.0-1243.

Notice Requesting Submission of Opinion filed Nov. 15, 2007 in related Korean Application No. 10-2006-7017143.

U.S. Office Action mailed Oct. 17, 2008 in co-pending related U.S. Appl. No. 10/733,328 (20 pages).

U.S. Office Action mailed Jul. 21, 2009 in co-pending related U.S. Appl. No. 10/733,328 (21 pages).

U.S. Office Action mailed Jun. 9, 2009 in co-pending related U.S. Appl. No. 11/115,403 (4 pages).

U.S. Office Action mailed Oct. 27, 2009 in co-pending related U.S. Appl. No. 11/115,403 (27 pages).

Japan Office Action mailed on Sep. 9, 2008 and issued in related Japanese Patent Application 2003-422759 (4 pages).

Japanese Office Action mailed on Jan. 13, 2009 and issued in related Japanese Patent Application 2003-422759 (2 pages).

Ryusuke Masuoka, et al., "Policy-based Access Control for Task Computing Using Rei", *WWW* 2005, May 10-14, 2005, Chiba, Japan.

Yannis Labrou, et al., "Task Computing: Semantics-Oriented Middleware for Ubiquitous Computing", *WWW* 2005, May 10-14, 2005, Chiba, Japan.

U.S. Appl. No. 10/733,328, filed Dec. 12, 2003, Ryusuke Masuoka, et al., Fujitsu Limited Kawasaki, Japan.

U.S. Office Action mailed Sep. 13, 2010 in related co-pending U.S. Appl. No. 10/733,328.

U.S. Office Action mailed Jul. 22, 2010 in related co-pending U.S. Appl. No. 11/512,405.

U.S. Office Action mailed Oct. 4, 2010 in related co-pending U.S. Appl. No. 11/691,807.

Summons to Attend Oral Proceedings pursuant to Rule 115(1) EPC mailed Dec. 15, 2010 in a related European Application No. 03257974.0-1243/1431875.

U.S. Office Action issued Mar. 28, 2011 in co-pending U.S. Appl. No. 11/691,807.

Japanese Office Action issued on Mar. 8, 2011 in Japanese Patent Application No. 2005-365377 (3 pages) (4 pages English Translation).

Yukinori Morita, et al., "Tool of semantic Web", Information Processing, Japan, Information Processing Society Japan, Jul. 15, 2002, vol. 43, No. 7, pp. 734-741 (10 pages) (2 pages English Translation).

Office Action issued in Aug. 9, 2011 in co-pending U.S. Appl. No. 10/733,328.

U.S. Notice of Allowance issued Sep. 28, 2011 in related U.S. Appl. No. 11/512,405.

\* cited by examiner

FIG. 7 test1.owl

```xml
<?xml version="1.0"?>
<!DOCTYPE owl [
<!ENTITY owl "http://www.w3.org/2002/07/owl#">
<!ENTITY xsd "http://www.w3.org/2000/10/XMLSchema#">
<!ENTITY rdf "http://www.w3.org/1999/02/22-rdf-syntax-ns#">
<!ENTITY rdfs "http://www.w3.org/2000/01/rdf-schema#">
]>
<rdf:RDF
    xmlns:rdf="http://www.w3.org/1999/02/22-rdf-syntax-ns#"
    xmlns:rdfs="http://www.w3.org/2000/01/rdf-schema#"
    xmlns:owl="http://www.w3.org/2002/07/owl#"
    xmlns:a="http://www.biopax.org/release/biopax-level1.owl#"
>
<!-- Need to support further ontology metadata, import still missing -->
<owl:Ontology rdf:about="file:/home/patrick/workspace/BioSem/ontologies/_inst"/>
<owl:Class rdf:about= "http://www.biopax.org/release/biopax-level1.owl#protein">
</owl:Class>

<owl:DatatypeProperty rdf:about="http://www.biopax.org/release/biopax-level1.owl#NAME">
</owl:DatatypeProperty>
<owl:DatatypeProperty
rdf:about="http://www.biopax.org/release/biopax-level1.owl#SHORT-NAME">
</owl:DatatypeProperty>
<owl:DatatypeProperty
rdf:about="http://www.biopax.org/release/biopax-level1.owl#SYNONYMS">
</owl:DatatypeProperty>

<rdf:Description rdf:about="http://www.biopax.org/release/biopax-level1.owl#protein_inst">
  <rdf:type>
    <owl:Class rdf:about="http://www.biopax.org/release/biopax-level1.owl#protein">
    </owl:Class>
  </rdf:type>
  <a:SYNONYMS rdf:datatype="http://www.w3.org/2000/10/XMLSchema#string">pknut777@umiacs.umd.edu</a:SYNONYMS>
  <a:NAME rdf:datatype="http://www.w3.org/2000/10/XMLSchema#string">Adam Bazinet</a:NAME>
  <a:SHORT-NAME rdf:datatype="http://www.w3.org/2000/10/XMLSchema#string">Bazinet</a:SHORT-NAME>
</rdf:Description>

</rdf:RDF>
```

FIG. 8A test2.owl

```xml
<?xml version="1.0"?>
<!DOCTYPE owl [
<!ENTITY owl "http://www.w3.org/2002/07/owl#">
<!ENTITY xsd "http://www.w3.org/2000/10/XMLSchema#">
<!ENTITY rdf "http://www.w3.org/1999/02/22-rdf-syntax-ns#">
<!ENTITY rdfs "http://www.w3.org/2000/01/rdf-schema#">
]>
<rdf:RDF
    xmlns:rdf="http://www.w3.org/1999/02/22-rdf-syntax-ns#"
    xmlns:rdfs="http://www.w3.org/2000/01/rdf-schema#"
    xmlns:owl="http://www.w3.org/2002/07/owl#"
    xmlns:a="http://www.mindswap.org/2003/owl/swint/terrorism#"
    xmlns:b="http://bio.flacp.fujitsulabs.com/#"
>
<owl:Ontology rdf:about="file:/home/patrick/workspace/BioSem/ontologies/temp">
  <owl:imports rdf:resource="http://www.mindswap.org/2003/owl/swint/terrorism" />
</owl:Ontology>
<owl:Class rdf:about="http://www.mindswap.org/2003/owl/swint/terrorism#City">
</owl:Class>

<owl:DatatypeProperty rdf:about;"http://www.mindswap.org/2003/owl/swint/terrorism#name">
</owl:DatatypeProperty>

<rdf:Description rdf:about="http://bio.flacp.fujitsulabs.com/#City_inst0">
  <rdf:type>
    <owl:Class rdf:about= "http://www.mindswap.org/2003/owl/swint/terrorism#City">
    </owl:Class>
  </rdf:type>
  <a:name rdf:datatype="http://www.w3.org/2000/10/XMLSchema#string">College Park</a:name>
</rdf:Description>

</rdf:RDF>
```

FIG. 8B test3.owl

```xml
<?xml version="1.0"?>
<!DOCTYPE owl [
  <!ENTITY owl "http://www.w3.org/2002/07/owl#">
  <!ENTITY xsd "http://www.w3.org/2000/10/XMLSchema#">
  <!ENTITY rdf "http://www.w3.org/1999/02/22-rdf-syntax-ns#">
  <!ENTITY rdfs "http://www.w3.org/2000/01/rdf-schema#">
]>
<rdf:RDF
xmlns:rdf="http://www.w3.org/1999/02/22-rdf-syntax-ns#"
xmlns:rdfs="http://www.w3.org/2000/01/rdf-schema#"
xmlns:owl="http://www.w3.org/2002/07/owl#"
xmlns:a="http://www.biopax.org/release/biopax-level1.owl#"
xmlns:b="http://bio.flacp.fujitsulabs.com/#"
>
<owl:import rdf:resource="http://www.biopax.org/release/biopax-level1.owl" />

<!-- Need to support further ontology metadata, import still missing -->
<owl:Ontology
rdf:about="file:/C:/Program%20Files/eclipse/workspace/BioSem/ontologies/temp.owl" />
<owl:Class rdf:about="http://www.biopax.org/release/biopax-level1.owl#protein">
</owl:Class>

<owl:DatatypeProperty
rdf:about="http://www.biopax.org/release/biopax-level1.owl#COMMENT">
</owl:DatatypeProperty>
<owl:DatatypeProperty
rdf:about="http://www.biopax.org/release/biopax-level1.owl#SYNONYMS">
</owl:DatatypeProperty>

<rdf:Description rdf:about="http://bio.flacp.fujitsulabs.com/#protein_inst0">
  <rdf:type>
    <owl:Class rdf:about="http://www.biopax.org/release/biopax-level1.owl#protein">
    </owl:Class>
  </rdf:type>
  <a:COMMENT rdf:datatype="http://www.w3.org/2000/10/XMLSchema#string">epidermal growth factor beta-urogastrone</a:COMMENT>
  <a:SYNONYMS rdf:datatype="http://www.w3.org/2000/10/XMLSchema#string">EGF, URG</a:SYNONYMS>
</rdf:Description>
<rdf:Description rdf:about="http://bio.flacp.fujitsulabs.com/#protein_inst1">
  <rdf:type>
    <owl:Class rdf:about="http://www.biopax.org/release/biopax-level1.owl#protein">
    </owl:Class>
  </rdf:type>
  <a:COMMENT rdf:datatype="http://www.w3.org/2000/10/XMLSchema#string">v-raf-1 murine
```

FIG. 8C test3.owl
leukemia viral oncogene homolog 1</a:COMMENT>
  <a:SYNONYMS rdf:datatype="http://www.w3.org/2000/10/XMLSchema#string">RAF1,
</a:SYNONYMS>
</rdf:Description>
<rdf:Description rdf:about="http://bio.flacp.fujitsulabs.com/#protein_inst2">
  <rdf:type>
    <owl:Class rdf:about="http://www.biopax.org/release/biopax-level1.owl#protein">
    </owl:Class>
  </rdf:type>
  <a:COMMENT rdf:datatype="http://www.w3.org/2000/10/XMLSchema#string">growth factor receptor-bound protein 2</a:COMMENT>
  <a:SYNONYMS rdf:datatype="http://www.w3.org/2000/10/XMLSchema#string">GRB2, ASH, EGFRBP-GRB2, Grb3-3</a:SYNONYMS>
</rdf: Description>
<rdf:Description rdf:about="http://bio.flacp.fujitsulabs.com/#protein_inst3">
  <rdf:type>
    <owl:Class rdf:about="http://www.biopax.org/release/biopax-level1.owl#protein">
    </owl:Class>
  </rdf:type>
  <a:COMMENT rdf:datatype="http://www.w3.org/2000/10/XMLSchema#string">son of sevenless homolog 1 (Drosophila)</a:COMMENT>
  <a:SYNONYMS rdf:datatype="http://www.w3.org/2000/10/XMLSchema#string">SOS1, GF1, GGF1, GINGF, HGF</a:SYNONYMS>
</rdf:Description>
<rdf:Description rdf:about="http://bio.flacp.fujitsulabs.com/#protein_inst4">
  <rdf:type>
    <owl:Class rdf:about="http://www.biopax.org/release/biopax-level1.owl#protein">
    </owl:Class>
  </rdf:type>
  <a:COMMENT rdf:datatype="http://www.w3.org/2000/10/XMLSchema#string">v-Ha-ras Harvey rat sarcoma viral oncogene homolog</a:COMMENT>
  <a:SYNONYMS rdf:datatype="http://www.w3.org/2000/10/XMLSchema#string">HRAS, HRAS1, RASH1 </a:SYNONYMS>
</rdf:Description>
<rdf:Description rdf:about="http://bio.flacp.fujitsulabs.com/#protein_inst5">
  <rdf:type>
    <owl:Class rdf:about="http://www.biopax.org/release/biopax-level1.owl#protein">
    </owl:Class>
  </rdf:type>
  <a:COMMENT rdf:datatype="http://www.w3.org/2000/10/XMLSchema#string">platelet-derived growth factor beta polypeptide (simian sarcoma viral (v-sis) oncogene homolog)</a:COMMENT>
  <a:SYNONYMS rdf:datatype="http://www.w3.org/2000/10/XMLSchema#string">PDGFB, PDGF2, SIS, SSV, c-sis</a:SYNONYMS>
</rdf: Description>
<rdf:Description rdf:about="http://bio.flacp.fujitsulabs.com/#protein_inst6">

FIG. 8D test3.owl

```
<rdf:type>
  <owl:Class rdf:about="http://www.biopax.org/release/biopax-level1.owl#protein">
  </owl:Class>
</rdf:type>
<a:COMMENT rdf:datatype="http://www.w3.org/2000/10/XMLSchema#string">platelet-derived growth factor receptor, beta polypeptide</a:COMMENT>
  <a:SYNONYMS rdf:datatype="http://www.w3.org/2000/10/XMLSchema#string">PDGFRB, CD140B, JTK12, PDGF-R-beta, PDGFR, PDGFR1</a:SYNONYMS>
</rdf:Description>

</rdf:RDF>
```

FIG. 8E test4.owl

```xml
<?xml version="1.0"?>
<!DOCTYPE owl [
<!ENTITY owl "http://www.w3.org/2002/07/owl#">
<!ENTITY xsd "http://www.w3.org/2000/10/XMLSchema#">
<!ENTITY rdf "http://www.w3.org/1999/02/22-rdf-syntax-ns#">
<!ENTITY rdfs "http://www.w3.org/2000/01/rdf-schema#">
]>
<rdf:RDF
 xmlns:rdf:"http://www.w3.org/1999/02/22-rdf-syntax-ns#"
 xmlns:rdfs:"http://www.w3.org/2000/01/rdl-schema#"
 xmlns:owl:"http://www.w3.org/2002/07/owl#"
 xmlns:a="http://www.biopax.org/release/biopax-level1.owl#"
>
<!-- Need to support further ontology metadata, import still missing -->
<owl:Onlology rdf:about="file:/home/patrick/workspace/BioSem/ontologies/wooble.owl"/>
<owl:Class rdf:about="http://www.biopax.org/release/biopax-level1.owl#dataSource">
</owl:Class>

<owl:DatatypeProperty
rdf:about="http://www.biopax.org/release/biopax-level1.owl#COMMENT">
</owl:DatatypeProperty>

<rdf:Description
rdf:about="http://www.biopax.org/release/biopax-level1.owl#dataSource_inst0">
  <rdf:type>
    <owl:Class rdf:about:"http://www.biopax.org/release/biopax-level1.owl#dataSource">
    </owl:Class>
  </rdf:type>
  <a:COMMENT
rdf:datatype="http://www.w3.org/2000/10/XMLSchema#string">MINDSWAP</a:COMMENT>
</rdf:Description>
<rdf:Description
rdf:about:"http://www.biopax.org/release/biopax-level1.owl#dataSource_inst1">
<rdf:type>
    <owl:Class rdf:about:"http://www.biopax.org/release/biopax-level1.owl#dataSource">
    </owl:Class>
  </rdf:type>
  <a:COMMENT
rdf:dalatype:"http://www.w3.org/2000/10/XMLSchema#string">FLACP</a:COMMENT>
</rdf:Description>
<rdf:Description
rdf:about: "http://www.biopax.org/release/biopax-level1.owl#dataSource_inst10">
  <rdf:type>
    <owl:Class rdf:about:"http://www.biopax.org/release/biopax-level1.owl#dataSource">
    </owl:Class>
  </rdf:type>
```

FIG. 8F test4.owl

```
    <a:COMMENT
rdf:datatype="http://www.w3.org/2000/10/XMLSchema#string">FLACP</a:COMMENT>
</rdf:Description>
<rdf:Description
rdf:about="http://www.biopax.org/release/biopax-level1.owl#dataSource_inst11">
  <rdf:type>
    <owl:Class rdf:about="http://www.biopax.org/release/biopax-level1.owl#dataSource">
    </owl:Class>
  </rdf:type>
  <a:COMMENT
rdf:datatype="http://www.w3.org/2000/10/XMLSchema#string">FLACP</a:COMMENT>
</rdf:Description>
<rdf:Description
rdf:about="http://www.biopax.org/release/biopax-level1.owl#dataSource_inst2">
  <rdf:type>
    <owl:Class rdf:about="http://www.biopax.org/release/biopax-level1.owl#dataSource">
    </owl:Class>
  </rdf:type>
  <a:COMMENT
rdf:datatype="http://www.w3.org/2000/10/XMLSchema#string">UMIACS</a:COMMENT>
</rdf: Description>
<rdf: Description
rdf:about="http://www.biopax.org/release/biopax-level1.owl#dataSource_inst3">
  <rdf:type>
    <owl:Class rdf:about="http://www.biopax.org/release/biopax-level1.owl#dataSource">
    </owl:Class>
  </rdf:type>
  <a:COMMENT
rdf:datatype="http://www.w3.org/2000/10/XMLSchema#string">UMIACS</a:COMMENT>
</rdf:Description>
<rdf:Description
rdf:about="http://www.biopax.org/release/biopax-level1.owl#dataSource_inst4">
  <rdf:type>
    <owl:Class rdf:about="http://www.biopax.org/release/biopax-/evel1.owl#dataSource">
    </owl:Class>
  </rdf:type>
  <a:COMMENT
rdf:datatype="http://www.w3.org/2000/10/XMLSchema#string">MINDSWAP</a:COMMENT>
</rdf:Description>
<rdf:Description
rdf:about="http://www.biopax.org/release/biopax-level1.owl#dataSource_inst5">
  <rdf:type>
    <owl:Class rdf:about="http://www.biopax.org/release/biopax-level1.owl#dataSource">
    </owl:Class>
  </rdf:type>
  <a:COMMENT
```

FIG. 8G test4.owl

```
rdf:datatype="http://www.w3.org/2000/10/XMLSchema#string">MINDSWAP</a:COMMENT>
</rdf:Description>
<rdf:Description
rdf:about="http://www.biopax.org/release/biopax-level1.owl#dataSource_inst6">
  <rdf:type>
    <owl:Class rdf:about="http://www.biopax.org/release/biopax-level1.owl#dataSource">
    </owl:Class>
  </rdf:type>
  <a:COMMENT
rdf:datatype="http://www.w3.org/2000/10/XMLSchema#string">MINDSWAP</a:COMMENT>
</rdf:Description>
<rdf:Description
rdf:about="http://www.biopax.org/release/biopax-level1.owl#dataSource_inst7">
  <rdf:type>
    <owl:Class rdf:about="http://www.biopax.org/release/biopax-level1.owl#dataSource">
    </owl:Class>
  </rdf:type>
  <a:COMMENT
rdf:datatype="http://www.w3.org/2000/10/XMLSchema#string">UMIACS</a:COMMENT>
</rdf:Description>
<rdf:Description
rdf:about="http://www.biopax.org/release/biopax-level1.owl#dataSource_inst8">
rdf:type>
<owl:Class rdf:about="http://www.biopax.org/release/biopax-level1.owl#dataSource">
</owl:Class>
</rdf:type>
<a:COMMENT
rdf:datatype="http://www.w3.org/2000/10/XMLSchema#string">UMIACS</a:COMMENT>
</rdf:Description>
<rdf:Description
rdf:about="http://www.biopax.org/release/biopax-level1.owl#dataSource_inst9">
  <rdf:type>
    <owl:Class rdf:about="http://www.biopax.org/release/biopax-level1.owl#dataSource">
    </owl:Class>
  </rdf:type>
  <a:COMMENT
rdf:datatype="http://www.w3.org/2000/10/XMLSchema#string">UMIACS</a:COMMENT>
</rdf:Description>

</rdf:RDF>
```

FIG. 8H

DATA SEMANTICIZER

BACKGROUND OF THE INVENTION

1. Field of the Invention

The present invention generally relates to a method and computer system of providing semantic information for data. More particularly, the present invention relates to a method and a computer system annotating a large volume of semi-structured or unstructured data with semantics.

2. Description of the Related Art

Advancements in technology including computing, network, and sensor equipment, etc. have resulted in large volumes of data being generated. The collected data generally need to be analyzed, and this is traditionally accomplished within a single application. However, in many areas, such as bioinformatics, meteorology, etc, the data produced/collected by one application may need to be further used in other applications. Additionally, interdisciplinary collaboration, especially in the scientific community, is often desirable. Therefore, one key issue is interoperability in terms of the ability to exchange information (syntactic interoperability) and to use the information that has been exchanged (semantic interoperability). IEEE Standard Computer Dictionary: *A Compilation of IEEE Standard Computer Glossaries*, IEEE, 1990.

Conventional semantic World Wide Web, or "Web," technologies involving ontology-based representations of information enable the cooperation of computers and humans and can be used to assist with data sharing and management. Through ontological representation, the modeling of entities and relationships in a domain allows the software and computer to process information as never before [www.sys-con.com/xml/article.cfm?id=577, retrieved on Oct. 22, 2004]. Conventional semantic Web technologies are an extension of the World Wide Web, which rely on searching Web pages and bringing the Web page to the semantic Web page level. Therefore, conventional semantic Web technologies process Web pages, which as tagged documents, such as hypertext markup language (HTML) documents, are considered fully structured documents. Further, the conventional semantic Web technologies are only for presentation, but not for task computing (i.e., computing device to computing device task processing). WEB SCRAPER software is an example of a conventional semantic Web technology bringing Web pages, as structured documents, to the semantic level. However, adding semantics to semi-structured or unstructured data, such as a flat file, is not a trivial task, and traditionally this function has been performed on a case-by-case (per input data) manner, which can be tedious and error-prone. Even when annotation is automated, such automation only targets a specific domain to be annotated.

Therefore, existing approaches to semi-structured and unstructured data annotation, depend completely on user knowledge and manual processing, which is not suitable for annotating data in large quantities, in any format, and in any domain, because such existing data annotation approaches are too tedious and error-prone to be applicable to large data, in any format and in any domain. For example, existing approaches, such as GENE ONTOLOGY (GO) annotation [www.geneontology.org, retrieved on Oct. 22, 2004] and TRELLIS by University of Southern California's Information Sciences Institute (ISI) [www.isi.edu/ikcap/trellis, retrieved on Oct. 22, 2004], depend completely on user knowledge, are data specific, and per input data based, which can be tedious and error-prone. In particular, GENE ONTOLOGY (GO) provides semantic data annotated with gene ontologies, but GO is only applicable to gene products and relies heavily on expertise in gene products (i.e., generally manual annotation, and if any type of automation is provided, the automation targets only, or is specific to, gene products domain). Further, in TRELLIS, users add semantic annotation to documents through observation, viewpoints and conclusion, but TRELLIS also relies heavily on users to add new knowledge based on their expertise, and further, in TRELLIS semantic annotation results in one semantic instance per observed document.

To take full advantage of any collected data in semi-structured or unstructured format for successful data sharing and management, easier ways to annotate data with semantics are much needed.

SUMMARY OF THE INVENTION

A computer system to assist a user to annotate with semantics a large volume of electronic data in any format, including semi-structured to unstructured electronic data, in any domain. Therefore, the present invention provides an ontological representation of electronic data in any format and any domain.

An embodiment described herein is a computer-implemented method and system of defining a set of annotation elements to map a concept to electronic data as input data; generating a mapping rule, according to the set of annotation elements defined and a sample of the input data; mapping the concept to the input data by applying the mapping rule to the input data; and generating a semantic instance of the input data based upon the mapping of the concept to the input data.

According to an aspect of the described embodiment, the set of annotation elements to map the concept to the input data are a selected ontology corresponding to the input data, a selected ontology concept from the selected ontology, a mapping of a word or word phrase (as a data point) in the sample input data to the selected ontology concept from the selected ontology, and a pattern of the mapped word or word phrase relative to a structure of the sample input data.

The above as well as additional aspects and advantages will be set forth in part in the description which follows and, in part, will be obvious from the description, or may be learned by practice of the described embodiments.

BRIEF DESCRIPTION OF THE DRAWINGS

These together with other aspects and advantages which will be subsequently apparent, reside in the details of construction and operation as more fully hereinafter described and claimed, reference being had to the accompanying drawings forming a part hereof, wherein like numerals refer to like parts throughout.

FIGS. 6-7 are example images of graphical user interfaces of a data semanticizer semanticizing bioinformatics as input electronic data, according to an embodiment of the present invention.

FIGS. 8A-8H are example outputs of semantic instances, according to an embodiment of the present invention.

DETAILED DESCRIPTION OF THE PREFERRED EMBODIMENTS

Reference will now be made in detail to the present embodiments of the present invention, examples of which are illustrated in the accompanying drawings. The embodiments are described below to explain the present invention by referring to the figures.

Figure 1:
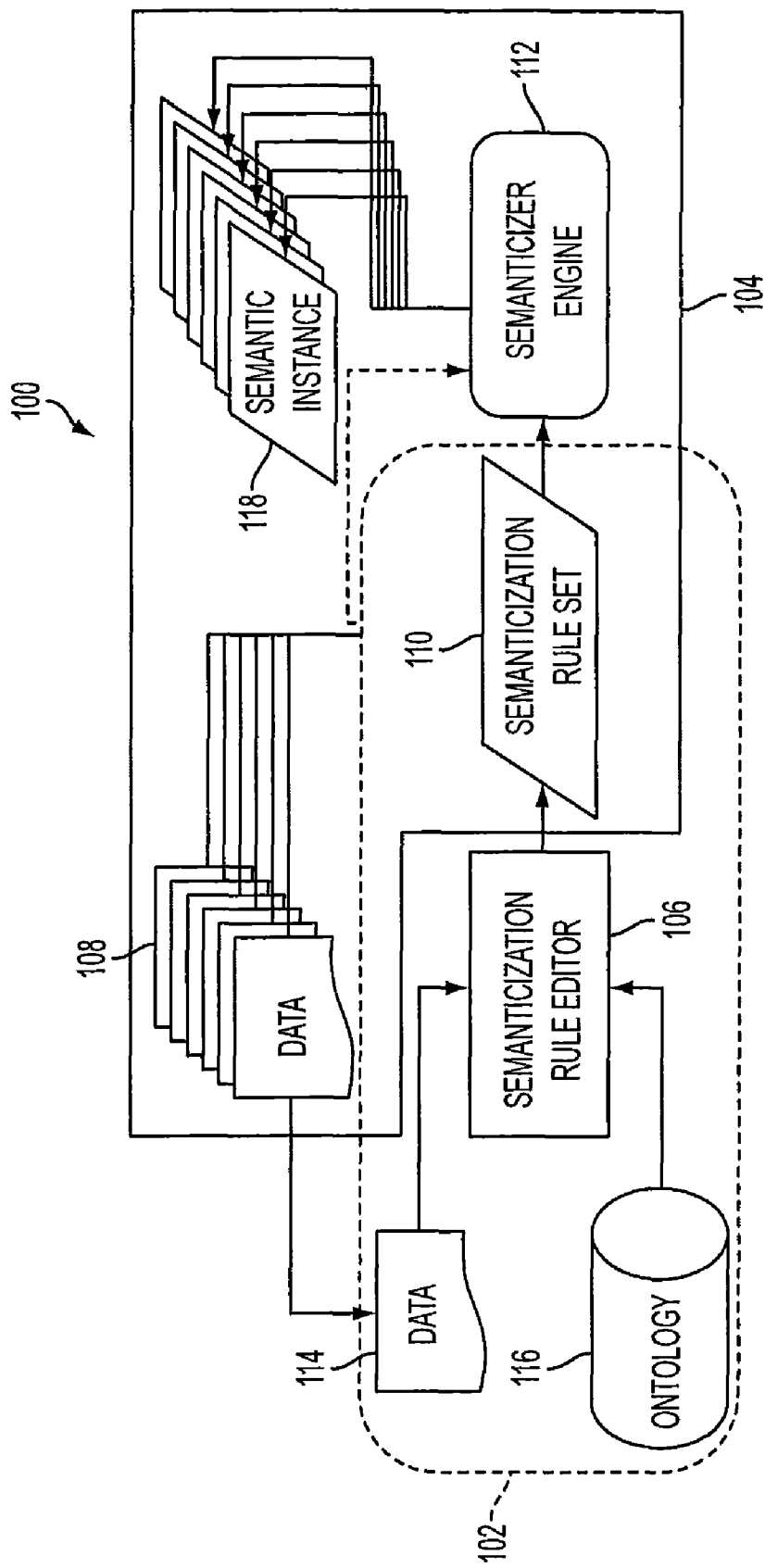
FIG. 1 is a flow chart of semanticizing data, according to an embodiment of the present invention.

FIG. 1 is a flow chart of semanticizing data, according to an embodiment of the present invention. The present invention provides a computer system, as a data semanticizer 100, to assist a user to annotate with semantics a large volume of electronic data 108, in any format, including semi-structured to unstructured electronic data, in any domain. The data semanticizer 100 annotates data 108, in any format, in any domain, with semantics using intuitive and efficient methods so that the data set can be entered into their knowledge base (knowledge base being a collection of facts and rules needed for solving problems).

For example, the data semanticizer 100 can be applied to structured data. As another example, the data semanticizer 100 can be used when data might be in a well understood format, but each output of the data from various software applications might be unique. It can be observed that each application, such as a bioinformatics analysis application, generates data in well understood formats, but that each run of the application is likely to be unique. For example, in case of bioinformatics, the output of the BASIC LOCAL ALIGNMENT SEARCH TOOL (BLAST), which compares novel sequences with previously characterized sequences, varies depending on input parameters, and the output could be different in terms of the number of matching sequences and the locations of matching sequences, etc. The NATIONAL CENTER FOR BIOTECHNOLOGY INFORMATION (NCBI) at the NATIONAL INSTITUTE OF HEALTH provides information on BLAST [www.ncbi.nih.gov/Education/BLASTinfo/information3.html, retrieved on Oct. 22, 2004] and also described by Altschul et al., *Basic Local Alignment Search Tool*, Journal of Molecular Biology, 251:403-410. Unlike Web pages, no special tags or similar mechanisms are used in the outputs of BLAST to identify the structure of the data. The data semanticizer 100 creates semantic instances of such semi-structured data based on selected ontology. Once semantic labels are provided, data properties can be identified that were otherwise obscured due to the many variations within the input and output data. For example, in case of BLAST, the actual gene sequences can be identified regardless of the many output representations. Therefore, the data semanticizer 100 can be used for data that is considered to be in semi-structured to unstructured format, when no special tags or similar mechanisms are used to identify structure of the data, and in any domain by allowing ontology selection.

FIG. 1 is a flow chart of a data semanticizer 100 to annotate electronic data 108, in any format, in any domain, with semantics, as implemented in computer software controlling a computer. In FIG. 1, a semanticization flow by the data semanticizer 100 comprises two semanticization operations of rule set generation 102 (shown in the dotted box), and semantic instances generation 104 (shown in the solid double polygon). The rule set generation 102 can be a one time (single) process (but not limited to a single process) and can be performed, for example, by either a domain expert or a system administrator. The domain expert or the system administrator can be human, computer implemented, or any combination thereof. Operation 102 generates a semanticization rule set 110. Once, at operation 102, the rule set 110 is available, at operation 104, semantic instance(s) 118 can be generated based upon the rule set 110. A "semantic instance" 118 is a set of description(s) on an individual item based on a concept(s). An item(s) can be any part of input data 108.

More particularly, as shown in FIG. 1, the present invention provides a computer-implemented method comprising, at operation 106, defining a set of annotation elements (implemented as a semanticization rule editor 106) to map a concept to electronic data 108 as input data. Operation 106 essentially allows capturing a structure of electronic data 108. A mapping rule(s) 110, according to the set of annotation elements defined and a sample(s) 114 of the input data 108, is generated, to capture the structure of the input data 108 and to map a concept to the input data 108 (i.e., the semanticization or mapping rule set 110 is determined/generated). Operation 112 comprises mapping the concept to the input data 108 by applying the mapping rule 110 to the input data 108, to generate a semantic instance(s) 118 of the input data 108 based upon the mapping rule 110 applied to the input data 108. The set of annotation elements to map a concept to the input data 108, or to capture the structure of the input data 108, which are implemented in the semanticization rule editor 106, comprise a selected sample 114 of the input data 108, a selected ontology 116 corresponding to the input data 108, a selected ontology concept from the selected ontology 116, a mapping of a word or word phrase (i.e., the word or word phrase being an example of a data point) in the sample input data 114 to the selected ontology concept from the selected ontology 116, and a pattern of the mapped word or word phrase relative to a structure of the sample input data 114 (i.e., a phrase and/or a region of a phrase in the selected sample input data 114 mapped to the selected ontology concept from the selected ontology 116).

The ontology 116 can be one or more of same and/or different domain ontologies stored on computer readable media according to an electronic information format, such as Web Ontology Language (OWL) file format. Therefore, the data semanticizer 100 is not limited to generating semantic instances 118 corresponding to a single ontology 116, and the data semanticizer 100 can generate semantic instances 118 where different data parts map to a plurality of different ontologies 116. For example, let's consider the input data 108 string "A research fellow at FUJITSU LABORATORIES OF AMERICA (FLA) leads a Task Computing project. He was also involved in LSM, Agent, and other projects during his tenure at FLA. He is also an adjunct professor at UNIVERSITY OF MARYLAND (UM) advising several students." To annotate such data 108, most likely it will involve ontology concepts defined in an FLA ontology 116 (e.g. projects managing, projects involved properties, etc) and a UM ontology 116 (e.g., advisees, topics properties, etc.).

The generating of the mapping rule 110 to map a concept to the input data 108, or to capture the structure of the input data 108, comprises, at operation 106, suggesting a sample mapping of a concept (i.e., the selected ontology concept from the selected ontology 116) to a word or word phrase in a sample input data 114, as the mapping rule of the input data 108, and selecting a suggested mapping as the mapping rule of the input data 108, or a data structure rule of the input data 108. At operation 112, the mapping rule 110 is applied to the input data 108 to map the concept to the input data 108 to output semantic instances 118. Therefore, "a mapping rule" (semanticization rule set in FIG. 1) 110 is based upon a mapping of a word or word phrase relative to a structure of input data 108. The sample input data 114 can be, for example, a sample number of opened input data files 114 (e.g., 10 files each containing one email from among hundreds of files), or can be one input data file 114 that contains a number of records (e.g., one file containing hundreds of emails from among a plurality of files, where the user works with one email in the one file, but the system suggests all or any subset of email addresses appearing in the rest of the file(s)).

One main challenge solved by the data semanticizer 100 is capturing a structure of semi-structured to unstructured electronic data 108 to semanticize. The data semanticizer 100, at operation 106, as a data structure capture element, or annotation element, uses a small number of representative samples 114 of the data 108, when one has incomplete knowledge of the data format. As another data structure capture element, at operation 106, a mapping is performed of a phrase and/or a region of a phrase in the selected sample input data 114 to a selected ontology concept from the selected ontology 116. Further, at operation 106, as two other elements to capture the structure of the input data, location information, a regular expression, or any combination thereof, are used in the generating of the rule to locate, in the selected sample input data 114, the phrase and/or to determine the region of the phrase, mapped to the selected ontology concept from the selected ontology 116.

The two example data structure capture elements of location-based and regular expression-based, assume neither the prior knowledge of data format nor assistance from the user. However, the data semanticizer 100 can efficiently (e.g., simply, quickly, and highly effectively) incorporate assistance from a user, which will make the process of capturing the structure of data 108 easier. With the help of a user with domain expertise and a selected ontology 116, the data semanticizer 100 generates a semanticization rule set 110, which is then used to create semantic instances for a large volume of semi-structured to unstructured data 108. In this process of annotating data, human interactions might not be completely eliminated by using a human domain expert, however, the data semanticizer 100 substantially reduces expert human assistance and dependency in semanticizing a large volume of data 108 in any format and in any domain. Therefore, the data semanticizer 100 supports a semi-automated method of providing semantic information for application data 108.

The role of the data semanticizer 100 is to annotate data with semantics to bring data into a higher level of abstraction. Low level data can be easily extracted from higher levels of abstraction, but this is not true for the other direction. An example is comparing structured to unstructured data. Structured data is easy to represent in plain text format. For example, a LATEX document can be easily converted to a format for a display or a printer (LATEX to Device-Independent (DVI) file format to Bitmap). However, converting a Bitmap to a LATEX document would be extremely difficult; this is where the data semanticizer 100 helps, because of the efficient defined set of elements (implemented as a semanticization rule editor) to capture a structure of electronic data as input data, generating a rule according to the set of elements defined to capture the structure of the input data, applying the rule to the input data, and, generating a semantic instance of the input data based upon the rule applied to the input data. With the data semanticizer 100, the procedure of annotating data with semantics can be completed with reduced human interactions. Therefore, a new term, "semanticize," is introduced to denote adding semantic annotations to data, according to the present invention.

In FIG. 1, as an example of operation 106, to generate a mapping rule 110 to map a concept to input data by capturing a structure of input data, comprises defining an atomic rule comprising, for example, a set of 6-tuples <C, W, R, K, P, O> as annotation or data structure capture elements where:

"C" is the concept from the selected ontology 116 corresponding to the class and its property for which the user wants to create an instance.

"W" is the word or word phrase in the sample data 114 that is being conceptualized. The user can specify "W" by, for example, highlighting the word(s) from a displayed sample data 114—for example, a displayed sample document from among a plurality of documents as the input data 108. The "C" and "W" are data structure capture elements that can incorporate user assistance.

"R" is the region of the "W" word or the word phrase relative to the structure of an input data 108 (or a portion of an input data 108), for example, a document. Typically in the present invention, the "R" element is determined relative to the structure of a sample 114 of the data 108 (or a portion a sample 114). Two methods of determining the "R" element to capture a structure of input data is described—location information and regular expressions. The details of these two methods, as data structure capture elements, are described further below. The "R" element is performed by the system (semanticization rule editor 106) as a representation of "C" and "W." In the present invention, the "R" data structure capture element is based upon an ontology and a data point (for example, a word or word phrase, and/or any other types of data points) mapped to a concept in the ontology, thereby providing a domain or ontology rule-based knowledge system to capture structure of input data. The present invention provides a method of defining a set of annotation elements to map a concept to electronic data.

"K" is the color that uniquely distinguishes one complete "C" concept from another in a displayed sample data 114. For example, assume creation of an instance of a class called Person, in which hasFirstName and hasLastName are properties. When creating a semantic instance of the class Person, the rule editor 106 automatically lists these two properties and groups them as properties of the same class by assigning the same color, in the displayed sample data 114. The present invention is not limited to coloring for distinguishing displayed concepts, and other perceptible distinguishing characteristics/attributes/techniques (e.g., visual and/or audible) can be used, such as (without limitation) visually distinguishing characteristics on a computer display screen via fonts, font sizing, underlining, bolding, italicizing, numbering, displaying icons, etc.

"P" is the priority of the rule. Priority is used to increase efficiency while reducing errors, when, at operation 112, applying a plurality of generated mapping rules 110 of the input data 108. Priority can be used to determine erroneous application of a rule set 110. When high priority rules cannot be applied, semantic instance creation process stops, whereas low priority rules can be safely ignored. For example, when trying to match words from the sample document 114 to an ontology concept from the ontology 116, some of the words may be important than others. For example, if a gene sequence includes a version number, the actual gene sequence can be given a higher priority than the version number, so that if some files omit the version number, the system does not fail to create semantic instances (i.e., mapping out the version number, if necessary).

"O" is the order in which a plurality of generated mapping rules 110 are applied; e.g., O1 is the first rule to be applied, O2 is the second rule to be applied, etc.

Therefore, a set of atomic rules together defines a rule set 110, referred to as a mapping, semanticization, or data structure capture, rule set 110, to map a concept to input data 108, such as documents, email messages, etc., in any format and in any domain. A minimum atomic rule comprises a set of 3 annotation or data structure capture, tuples <C, W, R>, of which "C" and "W" can incorporate user assistance. In the above example, the data structure capture elements <K, P, O>, enhance performance, but are not required. Further, the set of 3-tuples <C, W, R> can be combined in any combination with other data structure capture elements, such as, for example, the <K, P, O> data structure capture elements.

Two examples of methods, including any combinations thereof, for determining the region of word(s)—the "R" element—is described in more detail below. Therefore, the location information can be combined with regular expression as another method of determining the "R" element to capture a structure of input data.

Location Information—Using highlighted location information in the sample data 114, "R" is represented as 4-tuples, <L, S, N, E> (location data structure capture elements) where L is the line number,
S is the starting character position,
N is the number of lines, and
E is the ending character position essentially capturing "columns" corresponding to words to be conceptualized.

The location elements essentially capture a location in the sample input data 114 corresponding to the word or word phrase, as the "W" element, which is to be conceptualized by being mapped to the selected ontology concept from the ontology 116.

Regular Expressions (Patterns)—Alternatively, regular expressions can be used to deduce a pattern in the input data 108, via the sample data 114, for region of word(s)—the "R" element. In this approach, "R" is a regular expression, which is described in terms of assumptions, inputs, outputs, and the process, as follows"

Assumption examples:
The following is an example guideline used for an example input data 108 format:
The data consist of a number of records each with a number of fields.
The delimiters between records are easily recognizable.
Each field in a record has some defining characteristics, which distinguishes it from the other fields.
Input data 108 example:
A list of records containing the data which the user desires to parse.
The begin and end indices of a substring from within the data, this is an example of the data which the user desires to extract—the "W" data structure capture element.
A tolerance value which defines an acceptable match.
Process operations example:
1. Invoke a parse of input data 108 by passing an example substring and the data that is to be parsed (a sample 114), as a parameter. The example substring may be selected, for example, on a display of the input data 108 via any known selection techniques, such as highlighting, clicking, click and drag, etc.

2. A pattern generator/parser (semanticization rule editor 106) examines the passed parameter example substring and constructs a regular expression (a pattern), based upon a set of templates, which matches the example substring.

3. The parser then applies the regular expression to each record in the sample data 114, recording the start and end positions of any matches it finds.

4. After each record has been processed, the total number of matches for a particular regular expression is checked. The regular expression is rejected automatically, if the number of match count does not fall within the tolerance level (the number of records±the tolerance value). In this case, the parse returns to operation 2.

5. Otherwise, the list of matches made by the parse is presented to the user for examination, as suggestions. If the user accepts these suggestions, then the parsing is complete. Otherwise, the regular expression (pattern) is rejected and the parser returns to operation 2. The process continues until the user accepts the parser's matches or the parser runs out regular expressions. Therefore, the output of the pattern generator/parser 106 is a list of suggested matches.

Figure 2:
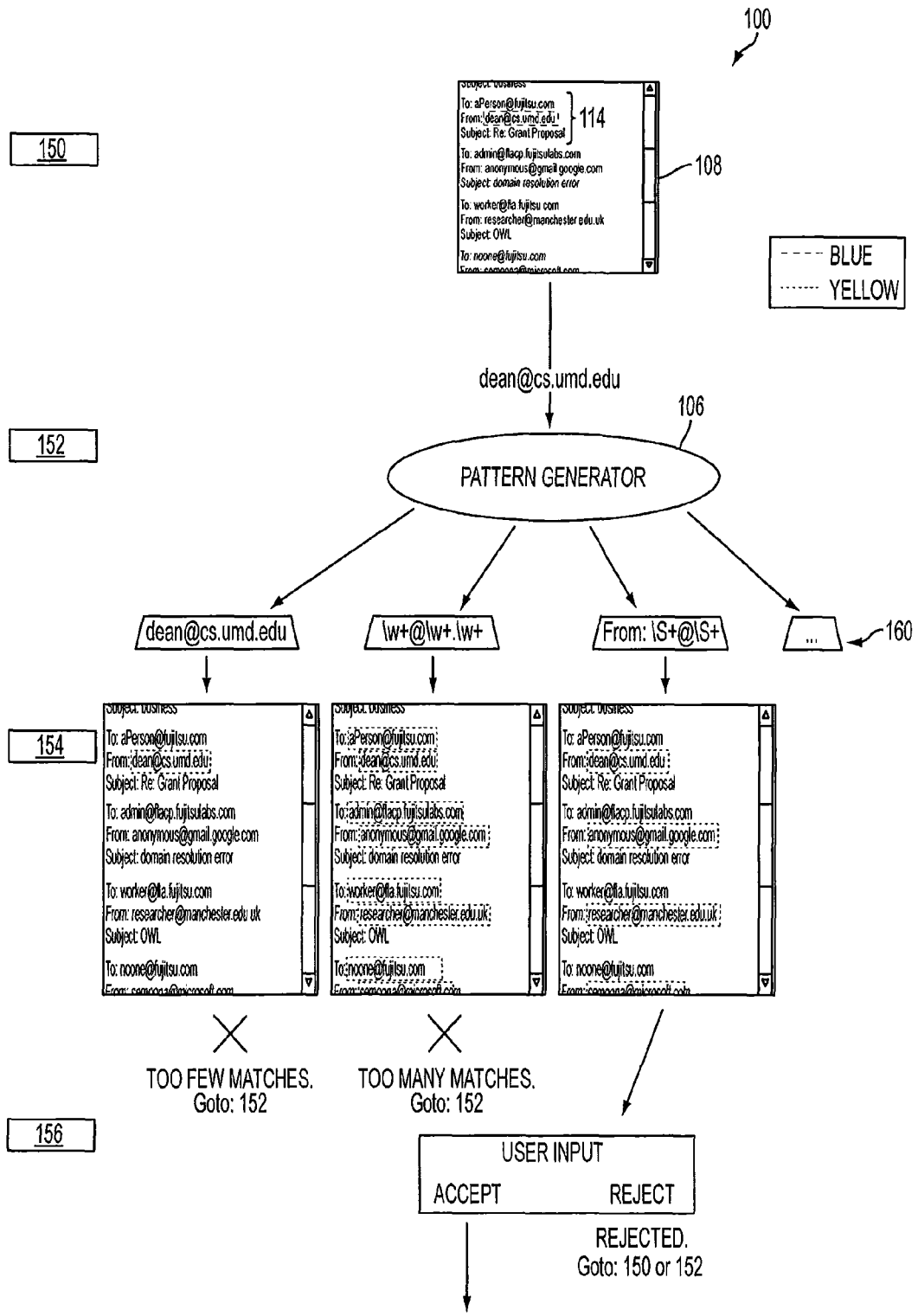
FIG. 2 is a flow chart of semanticizing email text as input electronic data, according to an embodiment of the present invention.

FIG. 2 is a flow chart of semanticizing email text as input electronic data, according to an embodiment of the present invention. More particularly, an example of semanticization by the semanticizer 100 according to the above process operations 1 through 5, using emails (email messages/text), as input data 108, and using the above-described regular expressions for the "R" data structure capture element to determine a region of the "W" data structure capture element, which is a mapping to the "C" data structure capture element, in a sample 114 of the input data 108, is shown with reference to FIG. 2.

In FIG. 2, at operation 150, the input file 108 contains a set of email headers, and "dean@cs.umd.edu" is the example substring—"W" data structure capture element—which is mapped (as shown via a displayed highlight) to a selected ontology concept from the ontology 116 (not shown in FIG. 2, but see FIG. 4) and serves as sample data 114 from the input file 108. At operation 152, the pattern generator (also referred to as the semanticization rule editor 106) attempts to approximate the structure of the given input file 108 based on regular expression templates 160. At operation 154, the pattern generator 106 suggests a regular expression 160, to capture the structure of the input file 108, to the user. At operation 156, the user examines the suggestion. At operation 156, the user can either accept or reject the suggestion of the regular expression as the structure rule of the input data 108.

More particularly, in FIG. 2, the left most case in operation 154 shows the string "dean@cs.umd.edu" as a match using the example string "dean@cs.umd.edu" as a regular expression—"R" data structure capture element. However, the input file 108 contains exactly one string that matches the regular expression "dean@cs.umd.edu," (indicated via display screen yellow highlighting) and this regular expression can be ignored, because it generated too few matches. The middle case in operation 154 shows all email addresses as being matched using the regular expression "\w+@\w+.\w+." This regular expression matched all of email addresses that appeared in the input file 108; however, this expression again can be skipped, because it generated too many matches. The third case in operation 154 shows the matches using the regular expression "From: \S+@\S+," in which the matches are suggested to the user for inspection. In the FIG. 2 example, the system 100 internally eliminates cases 1 (left) and 2 (middle), according to configurable application design criteria, but the claimed present invention is not limited to such a configuration and the system 100 could be controlled (programmed), for example, to suggest to the user all outputs of the pattern generator 106 including a recommended suggestion.

Regular Expression Templates:

Regular expression templates can be developed based on assumptions about the input data 108 or domain specific. For example, one of the assumptions can be that each field in a record has some defining characteristics. The templates are designed to be diverse enough to approximate any scenarios. The system 100 is scalable in that additional templates can be developed to fit different types of input data 108.

Figure 3:
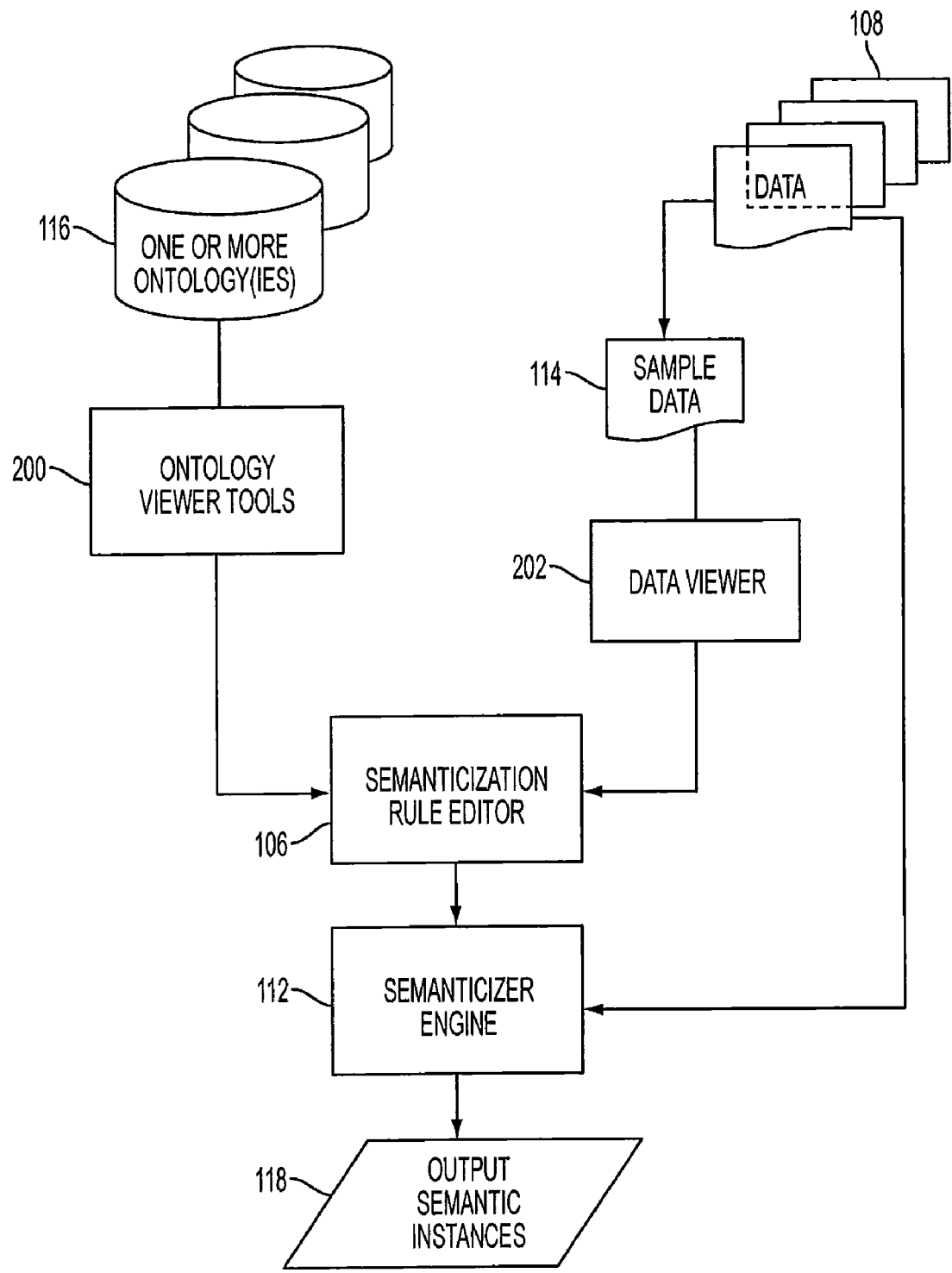
FIG. 3 is a functional block diagram of a data semanticizer, according to an embodiment of the present invention.
Figure 4:
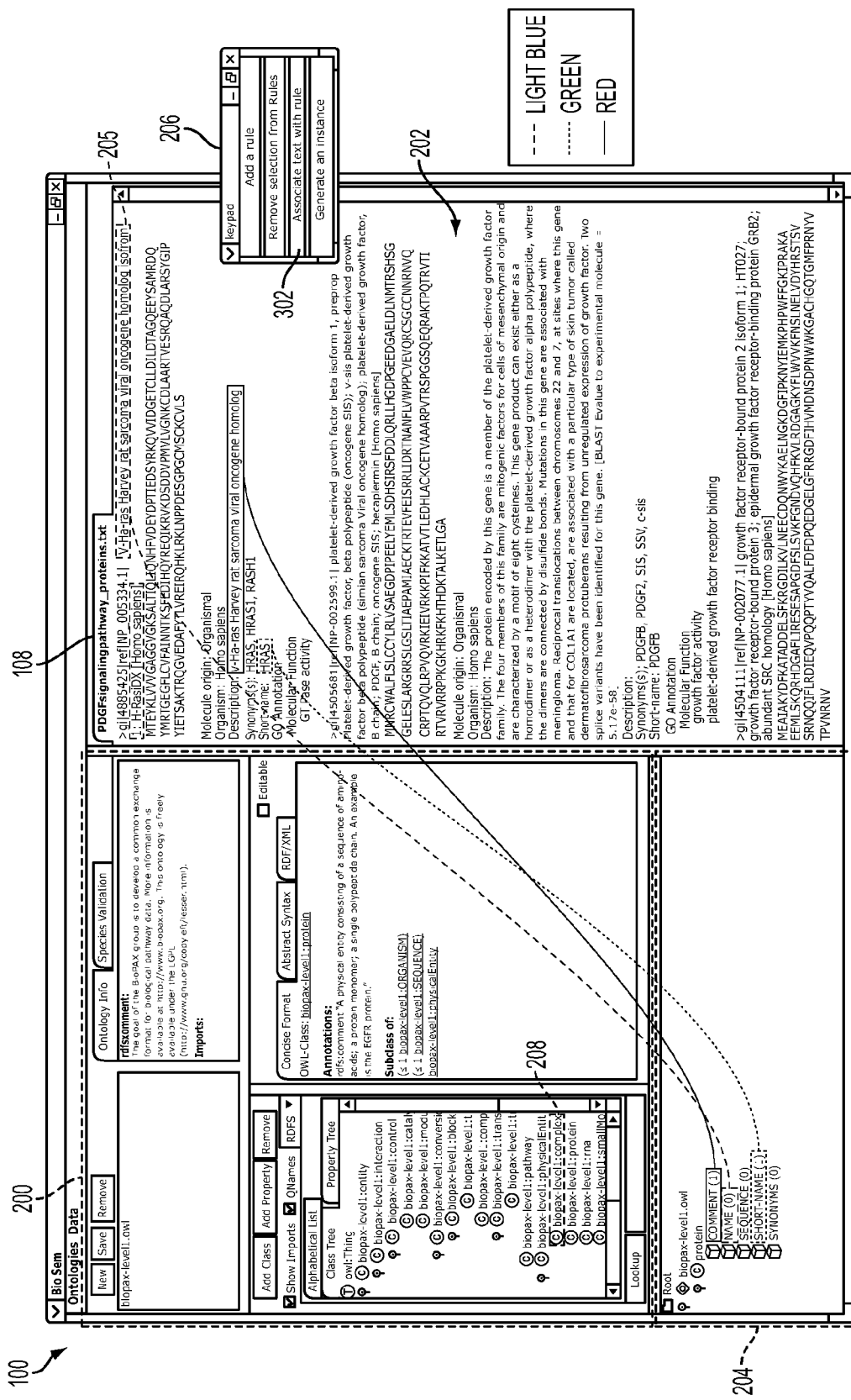
FIG. 4 is an example image of a computer displayed graphical user interface of a data semanticizer, according to an embodiment of the present invention.

FIG. 3 is a functional block diagram of a data semanticizer, according to an embodiment of the present invention. FIG. 4 is an example image of a computer displayed graphical user interface of a data semanticizer, according to an embodiment of the present invention. The data semanticizer 100, shown in FIG. 3, provides users with functionalities needed to semanticize data 108 and comprises the following components:

Ontology Viewer Tools 200: The ontology viewer 200, which typically in the present invention is a combination of software tools, allows domain experts to view and modify ontologies. New ontologies can be created if necessary. Any existing ontology editor can be used, such as SWOOP [www.mindswap.org/2004/SWOOP/, retrieved on Oct. 22, 2004], which is a scalable OWL (Web Ontology Language) ontology browser and editor. SWOOP supports the viewing of multiple ontologies in many different views including a traditional tree structure as well as a hyperlinked interface for easy navigation. FIG. 4 shows a computer displayed graphical user interface window of the ontology viewer tools 200.

Data Viewer 202: The data viewer 202 allows multiple data documents 108, as input electronic data in any format from structured to semi-structured to unstructured data and in any domain, to be displayed and semanticized in one batch. The formats the data view 202 supports can be, for example: txt, rtf and html documents. Only one document (or a portion thereof), as a sample 114, is necessary to generate the initial set of rules 110. FIG. 4 shows a computer displayed graphical user interface window of the data viewer 202.

Semanticization Rule Editor 106: The semanticization rule editor 106 takes samples 114 from a collection of data 108 and its corresponding ontology 116 as input and assists users in defining the semanticization rule set 110 per data collection 108. Typically in the present invention, the rule set 110 is generated with assistance from a domain expert who is familiar with the data collection. In FIG. 4, the computer displayed graphical user interface window 204 is an optional user interface window that can display various representations of operations by the semanticization rule editor 106 (i.e., semanticization rule viewer 204), such as displaying a generated rule expression—the "R" data structure capture element. In FIG. 4, the user interface window 204 displays ontology concepts, including a number thereof, that are mapped to the data displayed in the data viewer user interface window 202. For example, FIG. 4 shows that the COMMENT property of the protein concept (subclass) of the biopax-level1:PhysicalEntity class 208 is mapped once (1) and the ontology concept mapping is also visually indicated by a same color (red color in this example and also connected by a line)—the "K" data capture structure element—in both the semanticization rule editor user interface window 204 and the data viewer user interface window 202.

Semanticizer engine 112: The semanticizer engine 112 is a programmed computer processor that typically in the present invention runs in the background, which takes a large collection of data 108 and a semanticization rule set 110 to be applied to this data collection 108 and produces semantic instances 118 corresponding to the data collection 108.

Several additional components developed by FUJITSU LIMITED, Kawasaki, Japan, assignee of the present application, or others can be added to the ontology viewer tools 200 and the data viewer 202 environments. These include ontology mapping tools, inference engines, and data visualization tools. Ontology mapping tools, such as ONTOLINK [www.mindswap.org/2004/OntoLink, retrieved on Oct. 22, 2004] can be used to specify syntactic and semantic mappings and transformations between concepts defined in different ontologies. Inference engines such as PELLET [www.mindswap.org/2003/pellet/index.shtml, retrieved on Oct. 22, 2004] and RACER [www.cs.concordia.ca/~haarslev/racer/, retrieved on Oct. 22, 2004] can help check for inconsistencies in the ontologies and further classify classes. Data visualization tools, such as JAMBALAYA [www.thechiselgroup.org/jambalaya, retrieved on Oct. 22, 2004] and RACER INTERACTIVE CLIENT ENVIRONMENT (RICE) [www.cs.concordia.ca/~haarslev/racer/, retrieved on Oct. 22, 2004] can be used to present semantic instances 118 (i.e., data content 108 as annotated by the data semanticizer 100) with respect to its ontology 116, providing a visualization of annotated data 118, which can be displayed in the data viewer user interface window 202. In other words, any other third party ontology viewer and data viewer can be used, such as JAMBALAYA and RICE, which are visualization tools, to present annotated data content or a knowledge base with respect to its ontology, but such visualization tools do not have annotation capability.

Therefore, in FIG. 4, the computer displayed graphical user interface (GUI) of the data semanticizer 100 comprises three window panes: Ontology Viewer 200 on the upper left pane, Rule Viewer 204 on the lower left pane, and Data Viewer 202 on the right pane. FIG. 4 shows the data semanticizer 100 in its base state, in which ontology 116 has been loaded in the ontology viewer 200, some data 108 has been opened in the data pane 202, and a small set of rules has been added, as shown in the rule viewer 204 (i.e., ontology concepts, including a number thereof, that are mapped to the data 108 displayed in the data viewer user interface window 202. In other words, the rule viewer 204 displays the objects and data properties of the classes that the user wishes to instantiate. Also, information about the number of data points associated with each property can also be found in the rule pane 204.

Therefore, in FIG. 4, the rule pane 204 serves as a container for definitions of associations between ontological concepts 116 and raw data 108, these associations referred to as "mapping rules" 110 (i.e., rule pane 204 implemented as a computer readable medium storing mapping rules and GUI(s) based thereon). A "mapping rule" 110, is a mapping between an ontology representation 116, such as a Web Ontology Language (OWL) property, which is displayed in the ontology viewer 200, and some form of raw data 108, such as strings of text, which is displayed in the data pane 202. In FIG. 4, for example, the semanticization rule editor 106 maps a data point 205, as a sample 114, to a selected ontology class property NAME, as shown in the ontology viewer 200 and the rule viewer 204 (i.e., indicated by the same "K" value, which in this example is highlighted blue for NAME), and for which an "mapping rule" 110 is determined based on "R" data structure capture element by associating the data point 205 (e.g., text) with a rule, via the "Associate Text with Rule" 302. The purpose of the "mapping rule" 110 is to collect samples of data 114 that a smart parser (semanticization rule editor 106) can use to try to discover similar data through suggestions in the remainder of the database 108, as described in more detail below with reference to FIG. 6. Accordingly, the "mapping rule" 110 essentially captures a structure of data 108 based upon a selected domain ontology or the "mapping rule" captures an ontology structure of data 108. According to aspect of the invention, when the smart parser 106 correctly identifies data, the smart parser 106 adds its discoveries back into the original mapping rule definition. Thus, each correct guess by the smart parser 106, theoretically, increases its ability to recognize subsequent similar datum 108. The parser 106 is "smart" because the input file 108 might have no set pattern that can be assumed to parse. In most parsers, the structure of the input file is known and the parser makes use of the known structure to automate the parsing process. Without this prior structure knowledge, it can be quite difficult to automate the parsing process. The parser 106 automates the parsing by trying multiple templates, heuristics, and thresholds, to suggest ontology concept mappings, while typically in the present invention leaving the ultimate decision process to accept the suggestions to be done by humans, and where the suggestions can reflect, or be used to derive, a structure of the input file 108. Once the end user confirms that what the data semanticizer 100, as a "mapping rule" 110 has suggested is correct, the "mapping rule" 110 is stored and can be presented via the rule pane 204. As the data semanticizer 100 collect more rules 110 that are already confirmed by humans as correct, the data semanticizer can utilize these previously confirmed rules in the remainder of data semanticization process (operation 104) if similar patterns appear again. In other words, the tool 106 utilizes what it has learned about the input file 108.

The data pane 202 displays the data 108 from which the user wishes to extract data. Annotated data will be highlighted in different colors depending upon the property with which it is associated, as the "K" data structure capture element. As an example of inputting control commands to the data semanticizer 100, the keypad 206 is used as a handy menu type control panel, which allows the user to quickly execute certain common tasks, such as (without limitation and in any combination thereof) add a rule (i.e., map a data point to a selected ontology concept), remove selection from rules, associate text with rule to generate the "R" data structure capture element, and/or generate an instance. The present invention is not limited to the keypad 206 implementation, and, for example, to map a sample data point to an ontology concept, typically in the present invention any available displayed data selection techniques can be used, such as selecting a region of a displayed sample input data 114 in the data viewer 202 and dropping the grabbed selection into a displayed concept of the ontology 116 in the ontology viewer 200.

Figure 5:
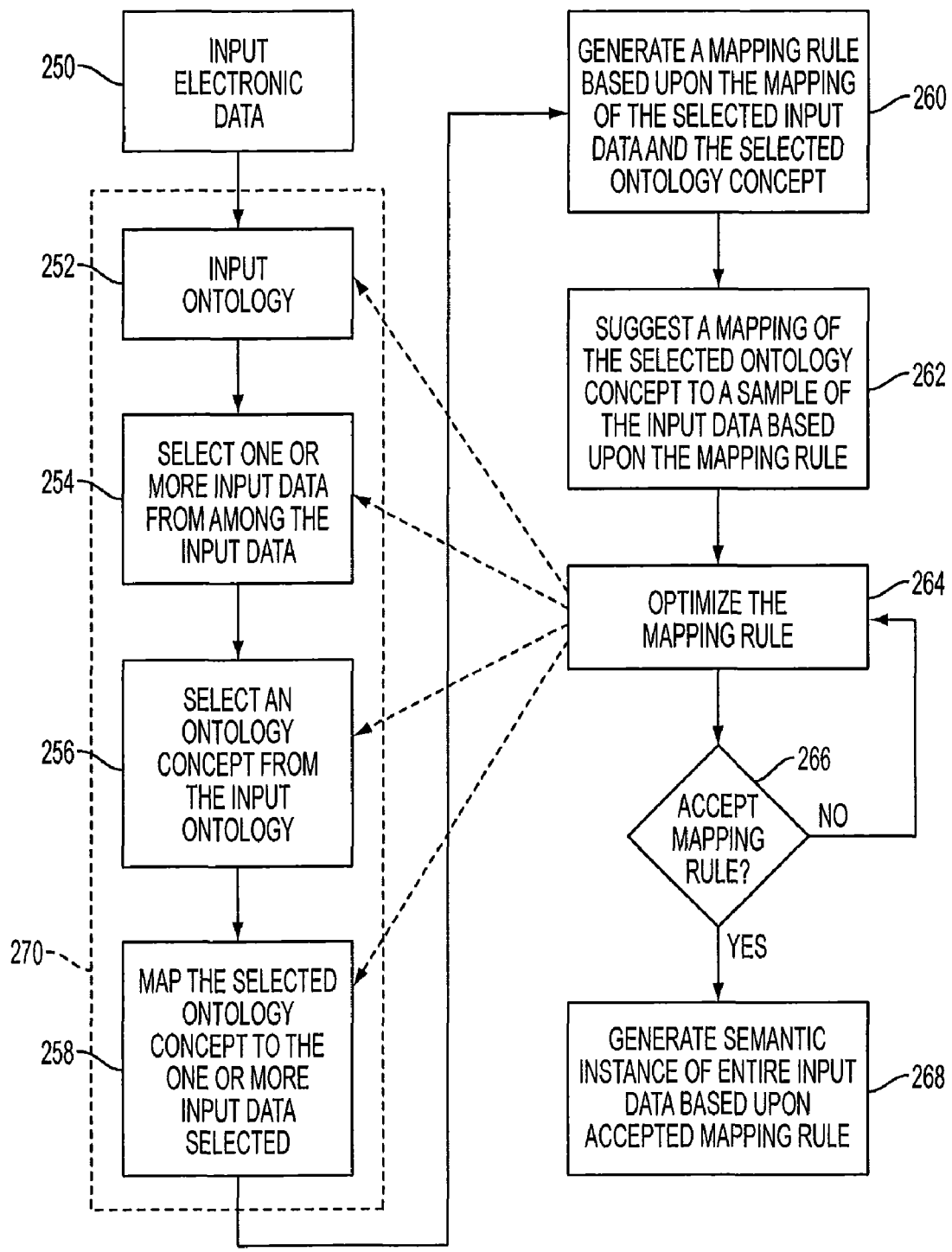
FIG. 5 is a flow chart of semanticizing bioinformatics data, as an example of input electronic data to be annotated, according to an embodiment of the present invention.

FIG. 5 is a flow chart of semanticizing bioinformatics data, as an example of input electronic data to be annotated, according to an embodiment of the present invention. In FIG. 5, a computer-implemented method of semanticizing data comprises, at operation 250, selecting electronic data, as input data 108, to semanticize; at operation 252, selecting, at least one ontology 116, which typically in the present invention is selected by a user; at operation 254, selecting one (or more as the case may be) input data from among the input data 108; at operation 256, selecting an ontology concept from the selected ontology 116, which typically in the present invention is selected by the user; at operation 258, mapping the selected ontology concept to the one (or more) input data selected, which-typically in the present invention incorporates the user's assistance/interaction; at operation 260, generating a mapping or data structure capture rule based upon the mapping of the selected ontology concept to the one (or more) input data, which is performed by the semanticization rule editor 106; at operation 262, suggesting a mapping of the selected ontology concept to a sample 114 of the input data 108, as a sample mapping, based upon the mapping rule; at operation 264, modifying/optimizing the mapping rule by modifying or adjusting the selected ontology, the one input data, the selected ontology concept, the mapping of the selected ontology concept to the one input data, or any combination thereof, which typically in the present invention the mapping rule modification or optimization incorporates the user's assistance/interaction; and, at operation 266, if a mapping rule suggestion is accepted, at operation 268, semanticizing the input data 108 by applying or populating the generated optimized mapping rule to entire input data 108, based upon an acceptable mapping suggestion, which typically in the present invention a mapping rule is accepted, if the user accepts a mapping suggestion by the semanticizer rule editor 106 that maps the selected ontology concept to the sample input data 114. For example, at operation 264, for mapping rule 110 optimization, the ontology 116 can be modified, the selection of the ontology 116 can be modified or changed, or any combination thereof.

Therefore, in FIG. 5, operations 252 through 258 provide a dynamically configurable semanticization or annotation guidance 270, which typically in the present invention is obtained via input by a domain expert by the ontology viewer tools 200, the data viewer 202 and the semanticization rule editor 106. The annotation guidance 270 provides guidance of what and where in a sample 114 of input data 108 a data point should be mapped to the ontology 116, and based upon the guidance 270 generate a data structure capture rule or a annotation/semanticization rule that could be applied across entire input data 108. In existing approaches, a user would have to deal with one file, as one input data, map the file to ontology, and move on to the next file, which is substantially a manual annotation process.

In FIG. 5, at operation 260, typically in the present invention, the semanticization rule editor 106 is configured to automatically reject or eliminate a data structure capture rule depending on a predetermined threshold (e.g., too many matches, too few matches, etc.) by internally generating rules and applying the rules to a sample 114 of the input data 108 and, at operation 262, to only suggest a rule through a perceptible (e.g., visual and/or audible) mapping of sample data points 114 and the ontology 116 that meets or exceeds the threshold.

Figure 6:
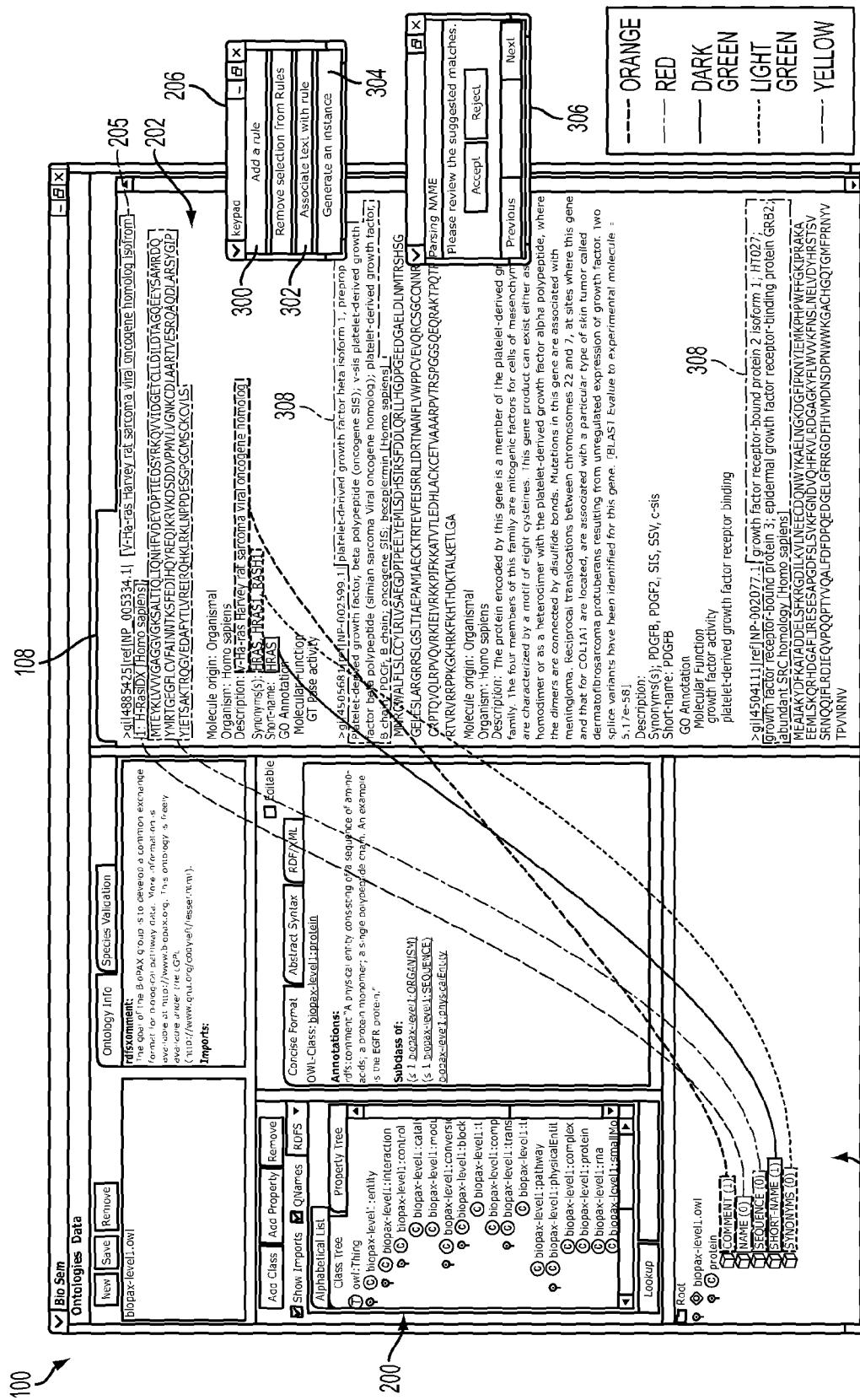
Figure 7:
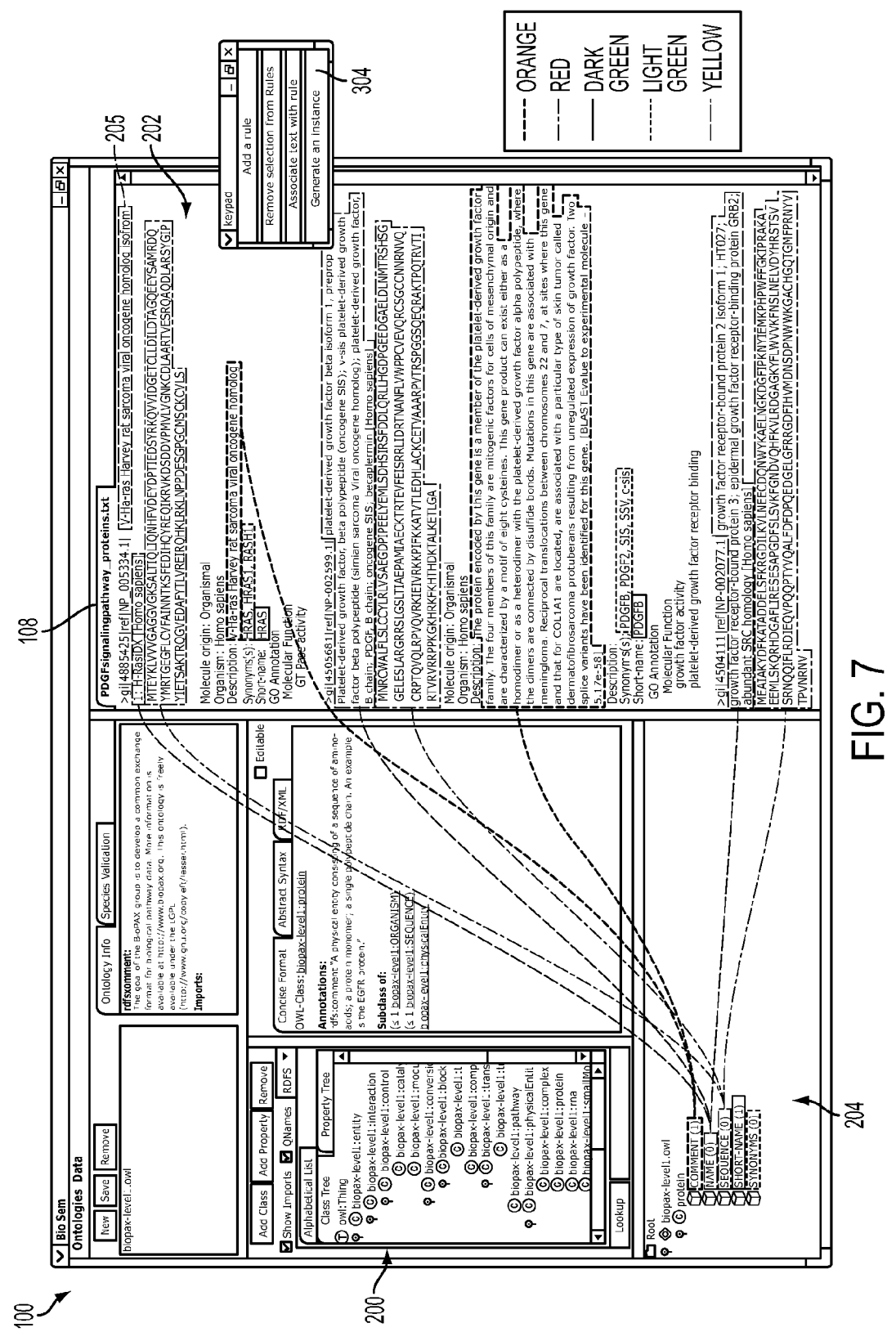

In FIG. 5, at operation 268, semantic instances 118 are output. Given the rule set 110 and the data set 108, the data semanticizer 100 generates corresponding semantic instances 118. FIGS. 6-7 are example images of graphical user interfaces of a data semanticizer semanticizing bioinformatics as input electronic data, according to an embodiment of the present invention. More particularly, FIGS. 6-7 show an example of the data semanticizer 100 annotating bioinformatics data using the regular expression method as the "R" data structure capture element. When a user accepts matches suggested by the data semanticizer 100 through the process similar to the processes shown in FIG. 2, a user may elect to populate rules 110 with data in the input file 108. A conveniently displayed selectable menu keypad 206 provides an easy access to frequently used menu items.

Although the description herein with reference to FIGS. 6-7 is directed to instance generation for all data points from open data files 108 in the data pane 202 (three data points >gi . . . are displayed in the data pane 202 of FIG. 6), a user may choose to create semantic instances of a few selected data points from open data files 108. This is an important capability since the data semanticizer 100 can generate updated semantic instances 118 as needed on demand. For example, a single record from a database 108 can be annotated and used instead of generating a large set of semantic instances from all the records in the database 108. Accordingly, although the above-described embodiment with reference to FIG. 5 describes using an input ontology 116, at least one input data 108 from among a plurality of the input data 108, and a sample 114 of the input data 108, the data semanticizer 100 is not limited to such a configuration and one or more ontologies 116, a plurality of input data 108 and a plurality of samples 114, or any combination thereof, can be used to generate one or more semantic instances 118.

In FIG. 6, for each selected ontology class and all of its properties mapped to a data point 108, as shown in the ontology viewer 200 and the rule viewer 204 (i.e., indicated, via a mapping by selecting "Add a Rule" 300, by the same "K" value, which in this example is highlighted orange for COMMENT (Description: . . . ), highlighted yellow for NAME, highlighted red for SEQUENCE, highlighted dark green for SHORT-NAME, and highlighted light green for SYNONYMS), the "mapping rules" are determined based on "R" data structure capture element by associating a data point (e.g., text) with a rule, via the "Associate Text with Rule" 302 (operation 260 in FIG. 5) and providing suggested matches 306 for acceptance, rejection and/or optimization (operations 262, 264 and/or 266 in FIG. 5). In particular, FIG. 6 shows that the parser 106 has just completed for data point 205 discovering similar data 308 for the NAME ontology class property, in a remainder of a sample 114 of a database 108, which is highlighted in yellow upon selecting "Associate Text with Rule" 302 and the parser 106 provides similar data suggestions 308 displayed by red color font.

Upon acceptance of suggestions and a successful completion of an error checking mechanism, a semantic instance can be created, via "Generate an Instance" selection 304, using the following procedure:

1. For each row of the same color "K," create an instance of the class with property values using "column" information stored.

2. Run Error Checking Mechanisms: This data validation process contains a set of tests to check for errors from the data files; e.g. the correct data files are being properly semanticized; that is, all the high priority rules are found. For example, if the initial data file has all characters accounted for, so should the rest of the data files.

3. If all the tests pass, new instances are generated (operation 268 in FIG. 5).

FIG. 7 shows all properties have been fully populated after selecting generate an instance 304, as indicated by the same "K" value, which in this example is a highlighted orange for COMMENT (Description: . . . ), highlighted yellow for NAME, highlighted red for SEQUENCE, highlighted dark green for SHORT-NAME, and highlighted light green for SYNONYMS. In FIGS. 4, 6 and 7, drawn lines also illustrate the mapping of ontology concepts to data points.

The data semanticizer 100 is flexible on the number of instances and files that can be generated. A single input file containing multiple data points can result in either a single output file with multiple semantic instances or multiple output files each containing one semantic instance of a data point. Likewise, multiple input files can result in either multiple output files or a single output file with semantic instances of all data points from multiple input files. Additionally, multiple input files each with multiple data points can result in multiple output files, each with multiple data points, not necessarily from corresponding input file. For instance, a user may wish to categorize input data points based on certain classifications.

FIGS. 8A-8H are example outputs of semantic instances, according to an embodiment of the present invention. In FIG. 8, the semantic instance outputs 118 are according to the Resource Description Framework (RDF)/Web Ontology Language (OWL) format. The concept of RDF/OWL is well known. In other words, the data semanticizer can directly assert the semantic objects(s) 118 into an RDF/OWL store. More particularly, FIG. 8A is an OWL document that is output by the data semanticizer 100 as a semantic instance 118 of bioinformatics application data 108 using the BIOPAX LEVEL 1 ontology 116. The BIOPAX LEVEL 1 ontology is described in [www.biopax.org, retrieved on Dec. 16, 2004]. As not limiting examples, the descriptions of FIGS. 8A through 8H are as follows:

FIG. 8A: One data point (in this case, non-biological data is used) is mapped to three properties (name, short name, and synonyms) of protein class of BIOPAX ontology 116. The output contains exactly one data point showing the capability to generate one semantic instance 118 per output file (test1.OWL).

FIG. 8B: One data point is mapped to name property of "city" class of terrorism ontology 116. Again, the output file test2.OWL contains exactly one data point as one semantic instance 118. Here it is illustrated that the tool 100 is just as applicable in other domains (other than bioinformatics domain). The reference for the terrorism ontology is [www-.mindswap.org/2003/owl/swint/terrorism, retrieved on Dec. 16, 2004].

FIGS. 8C-8E: Seven data points are mapped to two properties (comment and synonyms) of protein class of BIOPAX ontology 116. The input data points are biological data. This semantic instance output 118 example evidences the capability of generating multiple semantic instances 118 in one output file (test3.OWL).

FIGS. 8F-8H: Twelve data points are mapped to comment property of "dataSource" class of BIOPAX ontology 116. In addition to showing the capability to generate multiple semantic instances 118 in one output file (test4.OWL), it also shows that the parser 106 captures the input file 108 properly when there is no apparent pattern in the input file 108. In particular, in test4.OWL shown in FIGS. 8F-8H, there are twelve data points in an input file 108. They are, in the order of appearance, MINDSWAP, FLACP, FLACP, FLACP, UMIACS, UMIACS, MINDSWAP, MINDSWAP, MINDSWAP, UMIACS, UMIACS, and UMIACS. The data semanticizer 100 generates a regular expression 110 to capture the twelve data points when there is no pattern in the input file 108.

Figure 9:
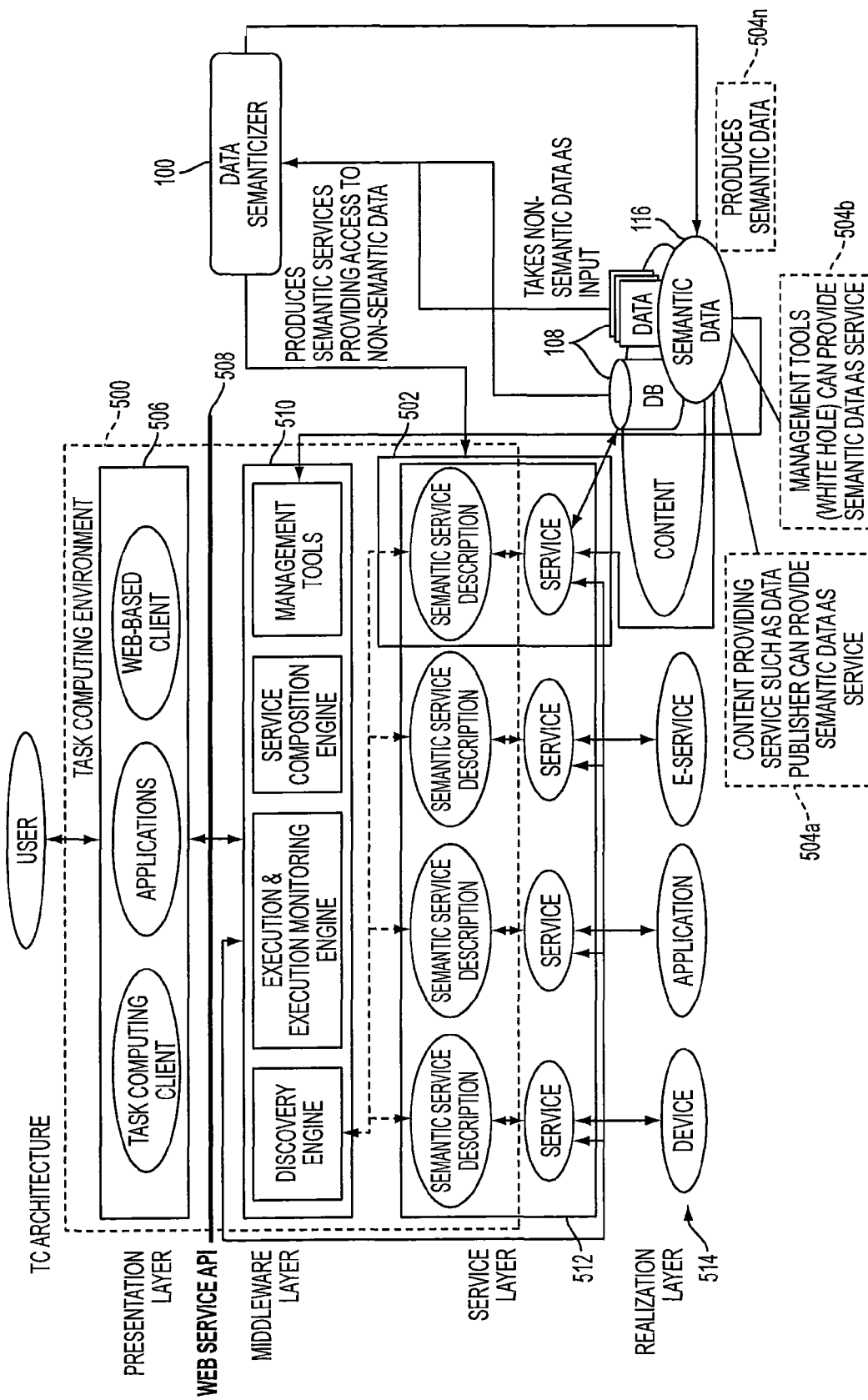
FIG. 9 is a diagram of a computing device network and a data semanticizer of the present invention used by a task computing environment to implement task computing on the computing device network.

FIG. 9 is a diagram of a computing device network and a data semanticizer 100 of the present invention used by a task computing (TC) environment to implement task computing on the computing device network. Task computing enables one to easily work with many devices, applications, and services. One aspect to add to an existing task computing environment 500 is the ability to integrate existing data, including databases, flat data file, etc. (input electronic data 108). Integrating such input electronic data requires annotating data with semantics. The data semanticizer 100 is a software tool to assist users to bring input electronic data 108 (i.e., takes non-semantic data as input) into a semantic layer by producing semantic services 502, via output semantic data 118, providing access to the non-semantic data, or outputting semantic data 118 that can be used to provide the output semantic data as a service 504a-n, bridging the gap between existing level of abstraction and the desired semantic abstraction. Therefore, with the data semanticizer 100, a task computing environment 500 can address data in the semantic layer and enable the ultimate integration of devices, applications, services and data. There are at least two different ways (although not limited to two) the data semanticizer 100 can provide semantic abstraction to the data 108. First, the data semanticizer 100 can provide semantic services 502 that provide access to non-semantic data 108. Second, the data semanticizer 100 can output annotated semantic output 118, which then can either be used by data providing services 504a-n, such as a directory publisher service 504a to provide semantic data as a service, or be used by a management tool 504b, such as WHITE HOLE to provide semantic data as a service.

In FIG. 9, the task computing environment 500 architecture, for example, comprises a presentation layer 506, a web service application programming interface (API) 508, a middleware layer 510, a service layer 512, and a realization layer 514. The data semanticizer 100 provides resource and service abstractions (realization layer 514) based upon input data 108 in any format and in any domain, using generated semantic instances 118, and creates a task computing environment 500 based upon the resource and service abstractions 514 of the input data 108. In other words, the present invention provides as a service a semantic instance 118, as an abstraction of the input data 108, usable within a task computing environment 500. The available data semantics 118 will then make it easier to interface with and migrate to new applications and platforms. Once annotated, the self-explanatory semantic data are more likely to be correctly used in context and one can also easily index and search semantically annotated data, making it easier to manage a large volume of data.

More particularly, the present invention provides a computer system, as a data semanticizer 100, to assist a user to annotate with semantics a large volume of electronic data in any format, including semi-structured to unstructured electronic data, in any domain. Therefore, the present invention provides an ontological representation of electronic data in any format and any domain. Use of semantic Web technologies to provide interoperability via resource and service abstractions, thereby providing a task computing environment, is successfully demonstrated and described by FUJITSU LIMITED, Kawasaki, Japan, assignee of the present application, in the following publications and/or patent applications (all of which are incorporated herein by reference) by R. Masuoka, Y. Labrou, B. Parsia, and E. Sirin, *Ontology—Enabled Pervasive Computing Applications*, IEEE Intelligent Systems, vol. 18, no. 5, September/October 2003, pp. 68-72; R. Masuoka, B. Parsia, and Y. Labrou, *Task Computing—the Semantic Web meets Pervasive Computing*, Proceedings of the 2nd International Semantic Web Conference 2003, Oct. 20-23, 2003, Sundial Resort, Sanibel Island, Fla., USA; Z. Song, Y. Labrou and R. Masuoka, *Dynamic Service Discovery and Management in Task Computing*, MobiQuitous 2004, Aug. 22-25, 2004, Boston, USA; Ryusuke Masuoka, Yannis Labrou, and Zhexuan Song, *Semantic Web and Ubiquitous Computing—Task Computing as an Example—AIS SIGSEMIS Bulletin, Vol.* 1 No. 3, October 2004, pp. 21-24; Ryusuke Masuoka and Yannis Labrou, *Task Computing—Semantic-web enabled, user-driven, interactive environments*, WWW Based Communities For Knowledge Presentation, Sharing, Mining and Protection (The PSMP workshop) within CIC 2003, Jun. 23-26, 2003, Las Vegas, USA; in copending U.S. non-provisional utility patent application Ser. No. 10/733,328 filed on Dec. 12, 2003; and U.S. provisional application Nos. 60/434,432, 60/501,012 and 60/511,741. Task Computing presents to a user the likely compositions of available services based on semantic input and output descriptions and creates an environment, in which non-computing experts can take advantage of available resources and services just as computing experts would. The data semanticizer 100 has a benefit of bringing similar interoperability to application data sets in any format and in any domain.

The existing approaches to data annotation, which depend completely on user knowledge and manual processing, are not suitable for annotating data in large quantities. They are often too tedious and error-prone to be applicable. The data semanticizer 100 assists users in generating rule sets 110 to be applied to a large data set 108 consisting of similar pattern files and automates the process of annotating the data 108 with the rule sets 110. This approach minimizes the human effort and dependency involved in annotating data with semantics.

Additionally, the automated data annotation process of the data semanticizer 100 allows rapid development of semantic data 118. Test results show that two files, each containing 550 Fast-A formatted protein sequences can be annotated using the BIOPAX-LEVEL1 ontology 116 without error in approximately 20 seconds once the user has accepted the suggestions.

One great advantage of using the data semanticizer is that one can take advantage of the Semantic Web technologies on output annotated data sets 118. The determination of data compatibility with applications is simplified and in some cases can be automated. Data can be more easily and appropriately shared among different applications and organizations enabling interoperability. For example, to date, the semantic data 118 generated by data semanticizer 100 has bee used in two applications; BIO-STEER and BIO-CENTRAL. The BIO-STEER is an application of task computing in the bioinformatics field, which gives the user flexibility to compose semantically defined services that perform bioinformatics analysis (e.g., phylogentic analysis). These semantic services exchange semantic data as the output of one service is used as the input to the next step. Using the data semanticizer 100, the semantic data 118 can be now passed to other semantic services with the appropriate translations.

The BIO-CENTRAL is a website which allows access to a knowledge-base of semantically annotated biological data. It exemplifies the benefits of a semantically described data. The data semanticizer 100 can be used to annotate molecular interaction data from the Biomolecular Interaction Network Database (BIND) [Bader, Betel, and Hogue, "BIND: The Biomolecular Interaction Network Database," Nucleic Acids, Res, PMID, Vol. 31, No. 1, 2003] with the BIOPAX-LEVEL1 (Biological Pathway Exchange Language) [Bader et al. "Bio-PAX—Biological Pathways Exchange Language, Level 1, Version 1.0 Documentation," BioPAX Recommendation, [www.biopax.org/Downloads/Level1v1.0/biopax-level.zip, retrieved on Oct. 22, 2004]] ontology. The annotated data 118 are then deposited into the BIO-CENTRAL database.

When the data is annotated with rich semantics, the data can be easily manipulated, transformed, and used in many different ways. However, the work of "pushing" data into a higher level is not trivial. The framework of data semanticizer 100 works as a "pump" and helps users to complete the procedure in a much easier way by defining (implementing in software) a set of annotation elements to capture a structure of electronic data as input data; generating a rule, according to the set of annotation elements defined and a sample of the input data, to capture the structure of the input data; applying the rule to the input data; and generating a semantic instance of the input data based upon the rule applied to the input data.

Recently, an increasing number of researchers of in both fields are recognizing the benefits and merits of bringing the Semantic Web and the Grid together [E-Science, IEEE Intelligent Systems, Vol. 19, No. 1, January/February 2004]. In order to take full advantage of the Semantic Web in the Grid, it is necessary to add semantic annotations to existing data. A small number of researchers have experimented with ways to annotate data with semantics. However, the existing approaches, such as GENE ONTOLOGY ANNOTATION [www.geneontology.org, retrieved on Oct. 22, 2004] and TRELLIS [www.isi.edu/ikcap/trellis, retrieved on Oct. 22, 2004], which completely depend on user knowledge, are often tedious and error-prone. The data semanticizer 100 provides a method to add semantics to the data with reduced human dependency.

Furthermore, the data semanticizer 100 is flexible in input data types and application domains. It can be applied to not only plain text data, but also other data types, such as relational databases, Extensible Markup Language (XML) databases, media (e.g., image, video, sound, etc.) files, and even the data access model in Grid Computing. The approach used in the data semanticizer is not domain specific as it is applicable to a variety of application domains, such as life science, government, business, etc. The data semanticizer 100 can play an important role in the deployment of Semantic Web technology as well. Further, the data semanticizer 100 provides the following: (a) any combination of a single input file or multiple input files can result in generation of a single output file containing multiple semantic instances, or multiple output files with each output file containing one or more semantic instances from the input data; (b) can provide a service which generates one semantic instance of user's choice; (c) can provide a service which generates a list of semantic instances of user's choice; (d) can provide a service which generates a list of all semantic instances in the input file; and (e) can directly assert the semantic object(s) into the RDF/OWL store and/or Relational Database(RDB).

The data semanticizer 100, comprising the above-described processes, is implemented in software (as stored on any known computer readable media) and/or computing hardware controlling a computing device (any type of computing apparatus, such as (without limitation) a personal computer, a server and/or a client computer in case of a client-server network architecture, networked computers in a distributed network architecture).

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A computer-implemented method, comprising:
    defining a set of annotation elements to map a concept to electronic data as input data, wherein the set of annotation elements include:
        a selected ontology corresponding to a domain of the input data,
        a selected ontology concept from the selected ontology as the concept to map,
        a mapping of a word or word phrase in a sample input data to the selected ontology concept from the selected ontology; and
        a pattern of a word or word phrase relative to a structure of the sample input data, for mapping to the selected ontology concept from the selected ontology;
    generating a mapping rule, according to the defined set of annotation elements;
    mapping the concept to the input data by applying the mapping rule to the input data; and
    generating a semantic instance of the input data based upon the mapping of the concept to the input data.

2. The method of claim 1, wherein the generating of the mapping rule comprises:
    suggesting a sample mapping of the concept to a word or word phrase in a sample input data, as the mapping rule of the input data; and
    applying the mapping rule in the mapping to map the concept to the input data.

3. The method of 2, wherein the suggesting of the sample mapping of the selected ontology concept from the selected ontology to the to the word or word phrase in the sample input data comprises same perceptibly distinguishing the word or word phrase in the sample input data as the selected ontology concept.

4. The method of claim 1, further comprising:
    providing the semantic instance, as an abstraction of the input data, usable within a task computing environment.

5. The method of claim 1, further comprising:
    displaying the input data, wherein the set of annotation elements defined to map the concept to the input data further comprises perceptibly distinguishing the selected ontology concepts of the selected ontology mapped to the sample of the input data displayed, and the perceptibly distinguishing comprises visually distinguishing same ontology concepts on a display screen via coloring, fonts, font sizing, underlining, bolding, italicizing, numbering, displaying icons, or any combination thereof.

6. The method of claim 1, further comprising:
    displaying in a first graphical user interface window the sample of the input data, and
    displaying in a second graphical user interface window the selected ontology,
    wherein the mapping of a word or word phrase in the sample input data to the selected ontology concept is performed according to a click-and-drag action between the first and second graphical user interfaces.

7. The method of claim 1, wherein the input data is structured, semi-structured, unstructured, or any combination thereof.

8. The method of claim 1, wherein location information, a regular expression, or any combination thereof determine the pattern of the mapped word or word phrase relative to the structure of the sample input data.

9. The method of claim 8, wherein templates of the location information and the regular expression depending on the input data are used to determine the pattern of the mapped word or word phrase relative to the structure of the sample input data.

10. The method of claim 1, wherein a plurality of mapping rules are generated and the method further comprises:
    assigning a priority to each mapping rule; and
    applying the mapping rules to the input data according to the assigned mapping rule priority.

11. The method of claim 1, wherein a plurality of mapping rules are generated and the method further comprises:
    assigning an order to each mapping rule; and
    applying the mapping rules to the input data according to the order of the mapping rules.

12. The method of claim 1, wherein templates are used to determine the pattern of the mapped word or word phrase relative to the structure of the sample input data.

13. The computer-implemented method according to claim 1, further comprising:
    approximating a structure of the sample input data based upon the mapping of the ontology concept;
    capturing a structure of the input electronic data according to the approximating of the structure of the sample input data; and
    generating semantic instances for the input electronic data based upon the captured structure of the data and/or the mapping of the concept to the input data.

14. The computer-implemented method according to claim 13, further comprising:
    optimizing the generated data structure capture rule according to the user input by modifying the selected ontology, the sample input data, the selected ontology concept, the mapping of the selected ontology concept to the sample input data, or any combination thereof.

15. The method of claim 13, wherein the capturing the structure of the sample input data further comprises:
    selecting the ontology concept by a user;
    suggesting to the user a mapping of the selected ontology concept to the sample input data; and
    approximating the structure of the sample input data, if the user accepts the mapping of the selected ontology concept to the sample input data.

16. The method of claim 1, wherein the input data is a single input file or multiple input files, and the generating of the semantic instance comprises generating a single output file containing multiple semantic instances, or generating multiple output files with each output file containing one or more semantic instances from the input data.

17. The method of claim 16, wherein the output files are according to the Resource Description Framework/Web Ontology Language and/or Relational Database format.

18. The method of claim 1, further comprising:
    selecting the sample of the input data by a user;
    mapping, by the user, the concept to the sample of the input data selected by the user,
    generating the mapping rule based upon the mapping by the user of the concept to the sample of the input data;
    mapping the concept to the input data based upon the generating of the mapping rule for the sample of the input data; and
    generating a semantic instance for the input data according to the mapping of the concept to the input data, thereby providing a user controlled data semanticization service for other input data.

19. The method of claim 18, wherein a plurality of concepts are mapped to the input data and a plurality of user controlled semantic instances are generated, and the method further comprises generating a list of the generated user controlled semantic instances based upon the input data.

20. The method of claim 18,
    wherein the mapping by the user comprises mapping a plurality of concepts from a plurality of ontologies to a plurality of samples of a plurality of the input data, and
    wherein the generating of the semantic instance comprises generating a plurality of semantic instances mapping the plurality of concepts from the plurality of ontologies to the plurality of the input data.

21. A computing apparatus, comprising:
    a programmed computer processor controlling the apparatus according to a process comprising:
        defining a set of annotation elements to map a concept to electronic data as input data, wherein the set of annotation elements include:
            a selected ontology corresponding to a domain of the input data,
            a selected ontology concept from the selected ontology as the concept to map,
            a mapping of a word or word phrase in a sample input data to the selected ontology concept from the selected ontology; and
            a pattern of a word or word phrase relative to a structure of the sample input data, for mapping to the selected ontology concept from the selected ontology;
        generating a mapping rule, according to the defined set of annotation elements;
        mapping the concept to the input data by applying the mapping rule to the input data; and
        generating a semantic instance of the input data based upon the mapping of the concept to the input data.

22. The apparatus of claim 21, wherein the generating of the mapping rule comprises:
    suggesting a sample mapping of the selected ontology concept from the selected ontology to the word or word phrase in the sample input data, as the mapping rule of the input data; and
    applying the mapping rule in the mapping to map the concept to the input data.

23. The apparatus of claim 21, wherein the apparatus controlling process by the programmed computer processor further comprises:
    providing the semantic instance, as an abstraction of the input data, usable within a task computing environment.

24. The apparatus of claim 21, wherein the apparatus controlling process by the programmed computer processor further comprises:
    selecting the sample of the input data by a user;
    mapping, by the user, the concept to the sample of the input data selected by the user,
    generating the mapping rule based upon the mapping by the user of the concept to the sample of the input data;
    mapping the concept to the input data based upon the generating of the mapping rule for the sample of the input data; and
    generating a semantic instance for the input data according to the mapping of the concept to the input data, thereby providing a user controlled data semanticization service for other input data.

25. The computing apparatus according to claim 21, wherein the programmed computer processor further executes operations comprising:
    generating a data structure capture rule based upon the mapping of the selected ontology concept to the sample input data;
    suggesting to the user a mapping of the selected ontology concept to other input data, as the data structure capture rule;
    optimizing the generated data structure capture rule according to the user input by adjusting the selected ontology, the sample input data, the selected ontology concept, the mapping of the selected ontology concept to the sample input data, or any combinations thereof, wherein the generating of the semantic instance includes semanticizing the input data based upon applying the generated optimized data structure capture rule to the other input data, if the user accepts the mapping suggestion that maps the selected ontology concept to the other input data and/or based upon the mapping of the concept to the input data.

26. A computing apparatus, comprising:

means for defining a set of annotation elements to map a concept to electronic data as input data by:

selecting an ontology corresponding to a domain of the input data, selecting an ontology concept from the selected ontology as the concept to map, mapping a word or word phrase in a sample input data to the selected ontology concept from the selected ontology, and determining a pattern of a word or word phrase relative to a structure of the sample input data, for mapping to the selected ontology concept from the selected ontology;

means for generating a mapping rule, according to the set of annotation elements defined and a sample of the input data;

means for mapping the concept to the input data by applying the mapping rule to the input data; and means for generating a semantic instance of the input data based upon the mapping of the concept to the input data.

* * * * *

UNITED STATES PATENT AND TRADEMARK OFFICE
CERTIFICATE OF CORRECTION

PATENT NO. : 8,065,336 B2  
APPLICATION NO. : 11/014904  
DATED : November 22, 2011  
INVENTOR(S) : Patrick Armstrong et al.

Page 1 of 1

It is certified that error appears in the above-identified patent and that said Letters Patent is hereby corrected as shown below:

IN THE CLAIMS:

Column 18, Line 21, In Claim 3, after "method of" insert -- claim --.

Signed and Sealed this
Twelfth Day of June, 2012

David J. Kappos
*Director of the United States Patent and Trademark Office*